United States Patent [19]
Suzuki et al.

[11] Patent Number: 5,949,962
[45] Date of Patent: Sep. 7, 1999

[54] METHOD FOR CALCULATING COLOR CORRECTION CONDITIONS, A METHOD FOR DETERMINING AN EXPOSURE AMOUNT FOR PRINTING, AN IMAGE PROCESSING APPARATUS, A PRINTING EXPOSURE APPARATUS AND A STORAGE MEDIUM

[75] Inventors: Tohru Suzuki; Yutaka Takei; Tsuyoshi Haraguchi, all of Tokyo, Japan

[73] Assignee: Konica Corporation, Tokyo, Japan

[21] Appl. No.: 08/782,598

[22] Filed: Jan. 13, 1997

[30] Foreign Application Priority Data

Jan. 18, 1996 [JP] Japan ................................ 8-006574
Nov. 29, 1996 [JP] Japan ................................ 8-319202

[51] Int. Cl.⁶ .......................... G06F 15/00; H04N 5/14; H04N 9/68
[52] U.S. Cl. .......................... 395/109; 348/577; 348/647
[58] Field of Search .......................... 395/109; 382/169, 382/271; 348/577, 647, 652

[56] References Cited

U.S. PATENT DOCUMENTS

| | | | |
|---|---|---|---|
| 5,365,353 | 11/1994 | Kraft | 358/518 |
| 5,384,601 | 1/1995 | Yamashita et al. | 348/577 |
| 5,680,477 | 10/1997 | Asada | 382/169 |
| 5,748,802 | 5/1998 | Winkelman | 382/169 |

FOREIGN PATENT DOCUMENTS

| | | | |
|---|---|---|---|
| 0534430 A2 | 3/1993 | European Pat. Off. | H04N 1/40 |
| 0576003 A1 | 12/1993 | European Pat. Off. | H04N 1/40 |
| 2293011 | 6/1976 | France | G06F 15/34 |
| 2912130 | 10/1980 | Germany | G03B 27/73 |
| 4309878 A1 | 11/1993 | Germany | H04N 1/46 |
| 5-66498 | 3/1993 | Japan | G03B 27/73 |
| WO 86/06905 | 11/1986 | WIPO | H04N 1/40 |

*Primary Examiner*—Andrew W. Johns
*Assistant Examiner*—Monica S. Davis
*Attorney, Agent, or Firm*—Frishauf, Holtz, Goodman, Langer & Chick, P.C.

[57] ABSTRACT

In a method of obtaining a color correcting condition for a color image on an image frame, plural color component image signals are obtained for each pixel of the color image of the frame, and the frame is divided into plural blocks each of which is composed of plural pixels. A block color density value statistic is obtained for each block from the plural color component signals of the plural pixels of each block, wherein the statistic indicates a relationship between a density value and a number of pixels indicating the density value. A chroma level of each block is evaluated based on the block color density value statistic; a frame color density value statistic is obtained from the plural color component signals of the plural pixels of the plural blocks of the frame by reducing an influence of a block evaluated as a high chroma block; and the color correcting condition for the color image is determined based on the frame color density statistic.

19 Claims, 10 Drawing Sheets

FIG. 8
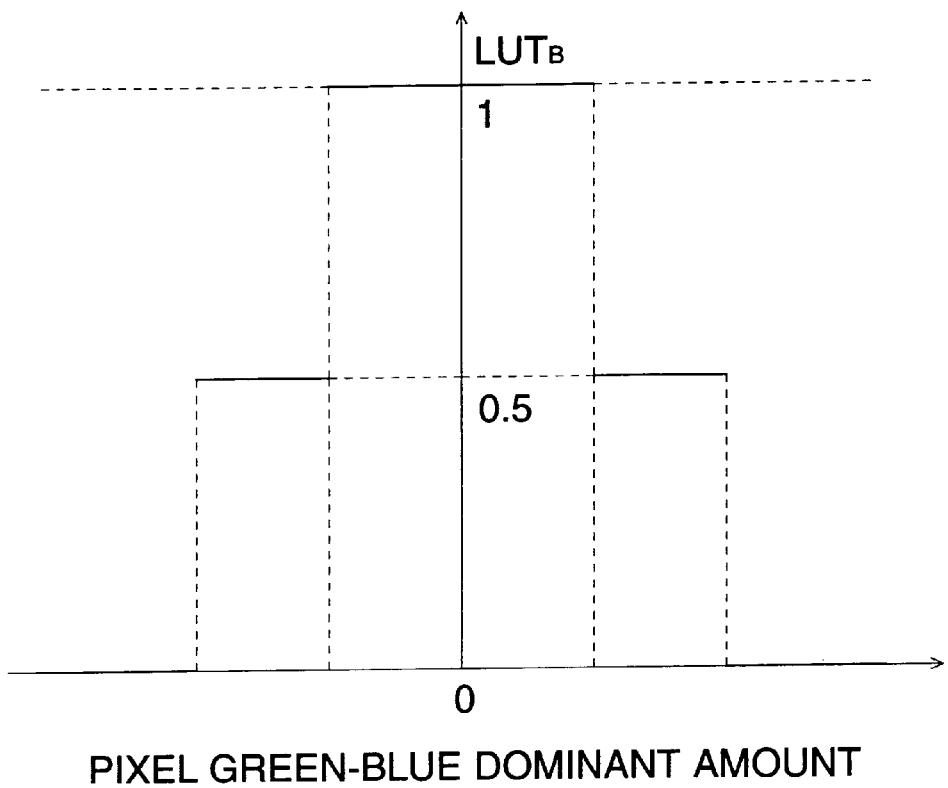
PIXEL GREEN-BLUE DOMINANT AMOUNT
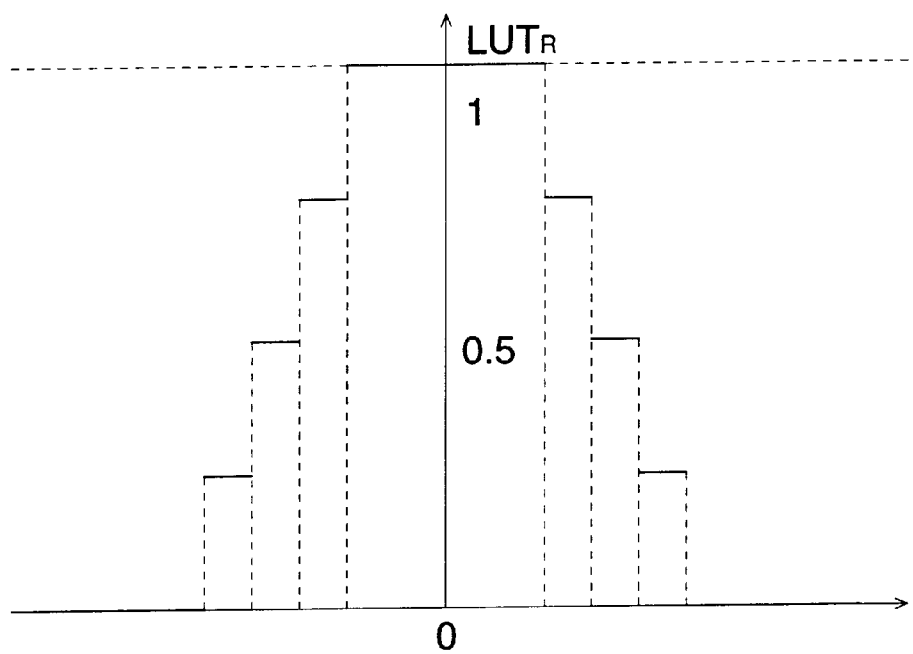
PIXEL RED-GREEN DOMINANT AMOUNT

METHOD FOR CALCULATING COLOR CORRECTION CONDITIONS, A METHOD FOR DETERMINING AN EXPOSURE AMOUNT FOR PRINTING, AN IMAGE PROCESSING APPARATUS, A PRINTING EXPOSURE APPARATUS AND A STORAGE MEDIUM

BACKGROUND OF THE INVENTION

The present invention relates to a method for calculating color correction conditions, a method for determining an exposure amount for printing, a method for processing images, an image processing apparatus, an image forming apparatus, a printing exposure apparatus and a storage medium.

In a conventional method for printing from a color photographic original, mean density of an entire area of a frame of the color photographic original is measured, and whereby exposure amount is controlled in a way that an exposure amount for each color of blue, green and red given to a light-sensitive material corresponding to the full area of the frame is constant, so that a print having an excellent color balance may be produced. However, when a frame of a color photographic original that is of a high chroma, namely, of a greatly deviated distribution of a color of an object, for example, of a color photographic original wherein the most part of the frame is occupied by a specific chromatic color, is exposed to light, the above-mentioned method reveals a problem that an optimum print is hard to be obtained.

Further, many of inputted color digital images are generally those obtained through image-pickup under a dynamic range that is narrower than a brightness range of an object and is narrower than a density range within which a color film is capable of recording. Therefore, in many cases, pixels with high chroma are converted to recordable colors to be put out of order in reproduction of color balance, and they are deviated in different colors due to a difference in inputting apparatuses or in kinds of color films, to become those with poor image quality wherein colors are deviated when they are outputted as they are.

Therefore, color balance is corrected by various methods for outputting. In these conventional methods, however, it has sometimes been impossible to obtain appropriate results because of a difference in inputting apparatuses or in kinds of color films, or in types of images.

In conventional methods, therefore, inputted digital images are displayed on a monitor, then correction is made through adjustment wherein an operator increases or decreases a data value of each color in image data while the operator observing the displayed image, and a hard copy which is a result of the correction is outputted. Then, the hard copy thus outputted is compared with the image displayed on the monitor, and a difference between them is used for a determination of the final correction, and a hard copy which is a result of the determined final correction is outputted. However, repeated correction and outputting take a long time, and a difference in skills of the operator results in a big difference in color quality of the hard copy obtained, which has been a problem.

For this problem, there has been made a proposal wherein each frame of a color photographic original having a plurality of frames is read, and when determining an exposure amount for obtaining a print from the color photographic original having a plurality of frames through exposure for printing based on each primary color information of each pixel in each frame thus obtained, a density difference between two sets of two primary colors and neutral density are obtained, and a value that is specific to the color photographic original is obtained for the exposure control, from the functional relation of the density difference between two sets of two primary colors and neutral density.

In this method, however, when there is a high chroma frame wherein the rate of high chroma pixels is high in frames of a color photographic original, it has been difficult to obtain a print having correct balance from such high chroma frame because of an influence of the high chroma pixel.

Heretofore, therefore, an influence of a high chroma pixel has been reduced to the utmost extent through the method for taking the statistics by reducing an influence of a high chroma pixel utilizing the correlation coefficient of a cumulative density function between primary colors as stated in Japanese Patent Publication Open to Public Inspection No. 66498/1993 (hereinafter referred to as Japanese Patent O.P.I. Publication), for example, or through the method as disclosed in German Patent No. 2912130 wherein each frame is judged whether it is a high chroma frame or not based on prescribed conditions between densities, then, statistics are taken excluding frames judged to be a high chroma frame, then, each pixel of frames judged not to be a high chroma frame is judged whether it is a high chroma pixel or not based on the statistics mentioned above, and statistics other than aforesaid statistics are taken excluding pixels judged to be a high chroma pixel, whereby an influence of the high chroma pixel may be reduced.

However, when statistics are taken excluding high chroma frames, pixels which are not of high chroma in the high chroma frames are eliminated from the statistics because pixel information on an entire frame is removed. Therefore, an amount of statistics can not be secured sufficiently, an appropriate amount of color correction can not be obtained, and therefore an exposure amount for obtaining images corrected properly in terms of color can not sometimes be obtained. On the other hand, when the condition to evaluate a pixel in a frame which is not high chroma to be high chroma is relaxed for securing an amount of statistics, a pixel which must be evaluated to be high chroma is not also evaluated to be a high chroma pixel, resulting in inability to remove an influence of a high chroma pixel sufficiently, thus, there has been a high rate of occurrence of images whose color balance is poor due to an influence of high chroma pixels.

In the method disclosed in German Patent No. 2912130, high chroma frames are first eliminated on a basis of an entire frame though high chroma pixels in a frame that is not of high chroma are eliminated, therefore, pixels which are not of high chroma included in a high chroma frame are also removed from the statistics, thus, an amount of statistics can not be secured sufficiently, resulting in the rate of occurrence of images having poor color balance which is still high. When the number of objective frames is only one, if the frame is evaluated to be high chroma, no statistics are obtained and an appropriate amount of color correction can not be obtained, which has also been a problem.

Even when statistics excluding high chroma pixels are taken by removing high chroma pixels under the prescribed condition based simply on the maximum density and minimum density, it is difficult to establish the condition for eliminating the high chroma pixels, and pixels which are not of high chroma are removed as a high chroma pixel by color fluctuation based on characteristics of a color film and characteristics caused by processing, and on the contrary, pixels which are primarily high chroma are not removed, thus all prints obtained have only been those whose fraction defective is still high.

SUMMARY OF THE INVENTION

An object of the invention is to obtain an appropriate amount of color correction by making it unnecessary for an operator to correct displayed images and thereby to obtain outputted images with high quality, even when a color original image is an image having highly biased colors.

It is a matter of course that the invention includes one wherein an operator corrects a displayed image after satisfying the requirements of the invention, and even in this case, operations of the operator can be saved.

Incidentally, we have achieved the invention by finding that it is possible to obtain an effective amount of statistics, even for images of only one frame, by dividing a frame of a color original image into a plurality of blocks each being composed of plural pixels adjoining successively and by taking statistics after reducing an influence of high chroma blocks, and whereby to output images with excellent color balance.

Themes of the invention can be attained by "each of the items for specifying the invention" described below.
Explanation of Method 1

Owing to "the method of calculating color correction conditions wherein a frame of a color original image is divided into a plurality of blocks each being composed of plural adjoining pixels, each divided block is evaluated in terms of chroma, first statistics between a density value of each primary color and the number of pixels showing the density value are obtained from pixels of the color original image through reduction of an influence of high chroma blocks in accordance of the evaluated chroma, each pixel of the color image is evaluated in terms of chroma based on the first statistics, second statistics between a density value of each primary color and the number of pixels showing the density value are obtained in accordance with the evaluated chroma by reducing an influence of high chroma pixels, and color correction conditions for the color original image are obtained in accordance with the second statistics", it is possible to obtain conditions of higher accuracy or eliminating an influence of high chroma pixels by obtaining aforesaid first statistics from the color original image through reduction of an influence of high chroma blocks, and whereby it is possible to reduce an influence of high chroma pixels with higher accuracy (reducing most of those whose influence as a high chroma pixel needs to be reduced) by obtaining aforesaid second statistics through reduction of an influence of high chroma pixels based on the first statistics, thus, it is possible to lower the possibility that the color correction conditions obtained based on the second statistics become color correction conditions generating images with poor color balance that is caused by an influence of high chroma pixels, if color correction is made by aforesaid color correction conditions.
Explanation of Method 2

When color correction conditions for a color original image are obtained by obtaining first statistics and second statistics from only one frame of color original image, if the frame has many high chroma pixels, a population with a sufficient amount of statistics can not be obtained in the first statistics and the second statistics, and appropriate color correction conditions sometimes can not be obtained as a result.

Since "a method of calculating color correction conditions described in Method 1 wherein aforesaid color original image is an image having plural frames" is used for obtaining first statistics or second statistics from an image having plural frames, a possibility for obtaining a population with a sufficient amount of statistics is high, and a possibility that color correction conditions for obtaining images with appropriate color balance can not be obtained is lower.
Explanation of Method 3

When removing on an entire block basis, pixels which are not of high chroma in a high chroma block are also removed from statistics. After that, if second statistics are taken without taking any action, a sufficient amount of statistics can not be secured, and color correction conditions for obtaining images with appropriate color balance sometimes can not be obtained.

Since "a method for obtaining color correction conditions described in method 1 or 2 wherein an influence of high chroma pixels is reduced and aforesaid second statistics are obtained based on aforesaid first statistics from each pixel of a color original image including also pixels of a block whose influence was reduced when obtaining the first statistics" is used for obtaining second statistics from pixels of an inputted color digital image including also pixels of a block whose influence was reduced when obtaining the first statistics, a sufficient amount of statistics can easily be secured, and a possibility that color correction conditions for obtaining images with appropriate color balance can not be obtained is lower.
Explanation of Method 4

It was found that a cumulative density function obtained from a color digital image having a broad frequency distribution wherein the number of pixels corresponding to a density value covers a broad density zone is preferable for obtaining a cumulative density function concerning the density value of each primary color and obtaining color correction conditions based on this cumulative density function. Namely, when there is a narrow peak of frequency distribution in a certain specific primary color density, a cumulative density function varies sharply around its density value, making proper processing of statistics impossible. Therefore, it is understood that when color correction is made by the obtained color correction conditions, the rate of occurrence of images with poor color balance is increased. It was further found that one of the causes for the narrow peak of frequency distribution for the density value of a certain specific primary color is an object in uniform specific color. It was also found that many of objects in uniform specific color are high chroma pixels.

Owing to "a method for calculating color correction conditions described in either one of Methods 1–3 wherein the first statistics and the second statistics are cumulative density functions relating to an density value of each primary color", most influences of those which are required to be reduced as high chroma pixels can be reduced, and an influence of an object in uniform specific color is reduced and an influence of a narrow peak of frequency distribution for a density value of a certain specific color can be reduced. Therefore, appropriate processing for statistics can be conducted, and a possibility that color correction conditions for obtaining images with appropriate color balance can not be obtained is lower.
Explanation of Method 5

Rapid processing is made possible by "a method for calculating color correction conditions described in either one of Methods 1–3 wherein aforesaid first statistics and second statistics represent statistics for relation between density values which are statistics showing the relation between density values which are different each other" wherein it is simple to judge and evaluate high chroma itself and the level of the high chroma because of the statistics therein showing the relation between densities instead of reflectance or transmissivity.

Explanation of Method 6

It is simple to take statistics through "a method for calculating color correction conditions described in Method 5 wherein aforesaid statistics for relation between density values are statistics for the relation between density of first primary color and density of second primary color which is different from the first primary color.

Explanation of Method 7

Owing to "a method for calculating color correction conditions described in Method 5 wherein aforesaid statistics for relation between density values are statistics for relation between a difference of primary color density which is a density difference between first primary color and second primary color that is different from the first primary color and neutral color density", it is possible to make memory capacity necessary for statistics smaller because information of primary color density difference in density difference outside the prescribed range can be ignored.

Explanation of Method 8

Owing to "a method for calculating color correction conditions described in either one of Methods 1–3 wherein aforesaid first statistics and second statistics are related to mean density concerning each primary color", it is possible to obtain the first statistics and second statistics through uncomplicated operation, and it is possible to obtain, through simple operation, color correction conditions which can correct to preferable color balance because statistic values capable of being adjusted to a color original image directly are obtained.

Explanation of Method 9

Owing to "a method for calculating exposure amount for printing wherein an exposure amount for printing necessary for giving exposure to a light-sensitive material from aforesaid color original image is obtained in accordance with the color correction conditions obtained through a method for calculating color correction conditions described in either one of Methods 1–8", it is possible to obtain a print with excellent color balance by giving exposure for printing using the obtained exposure amount for printing.

Explanation of Method 10

"An image processing method wherein a color outputted image is obtained by converting each pixel of aforesaid color original image in accordance with the color correction conditions obtained through a method for calculating color correction conditions described in either one of Methods 1–8 makes it possible to obtain a color outputted image with excellent color balance. When this color outputted image is used, it is possible to obtain a soft copy such as a monitor image with excellent color balance and a hard copy such as a print with excellent color balance.

Explanation of Structure 1

Owing to "an image processing apparatus having therein a means for calculating color correction conditions for obtaining color correction conditions by executing a method for calculating color correction conditions described in either one of Methods 1–8, and an image processing means for obtaining a color outputted image by converting each pixel of aforesaid color original image in accordance with color correction conditions obtained by aforesaid means for calculating color correction conditions", it is possible to obtain a color outputted image with excellent color balance. When this color outputted image is used, it is possible to obtain a soft copy such as a monitor image with excellent color balance and a hard copy such as a print with excellent color balance.

Explanation of Structure 2

"An image forming apparatus having therein the image processing apparatus described in Structure 1 and an image forming means for forming an image based on a color outputted image obtained by aforesaid image processing means" makes it possible to obtain a hard copy with excellent color balance.

Explanation of Structure 3

"An image forming apparatus forming an image based on a color outputted image obtained by aforesaid image processing method described in Method 10" makes it possible to obtain a hard copy with excellent color balance.

Explanation of Structure 4

"An exposure apparatus that gives exposure to a light-sensitive material from aforesaid color original image in accordance with exposure amount for printing obtained by the method for calculating exposure amount for printing described in Method 9" makes it possible to obtain a print with excellent color balance.

Explanation of Structure 5

"An exposure apparatus having therein an image reading means which reads a color original image and obtains information of pixels of the color original image, a means for calculating exposure amount for printing that executes the method for calculating exposure amount for printing described in Method 9 based on aforesaid information of pixels of the color original image obtained through aforesaid image reading means, and an exposure means that gives exposure for printing to a light-sensitive material from aforesaid color original image in accordance with an exposure amount for printing obtained by aforesaid means for calculating exposure amount for printing" makes it possible to obtain a print with excellent color balance.

Explanation of Medium 1

When a program stored in "a storage medium wherein a program for executing the method for calculating color correction conditions described in either one of Methods 1–8 is stored so as to be readable for a computer" is read, and executed by a computer, color correction conditions for correcting colors to excellent color balance can be obtained.

Explanation of Medium 2

When a program stored in "a storage medium wherein a program for executing the method for calculating exposure amount for printing described in Methods 9 is stored so as to be readable for a computer" is read, and executed by a computer, an exposure amount for printing for obtaining a print with excellent color balance can be obtained.

Explanation of Medium 3

When a program stored in "a storage medium wherein a program for executing the image processing method described in Methods 10 is stored so as to be readable for a computer" is read, and executed by a computer, a color outputted image with excellent color balance can be obtained.

Explanation of Medium 4

When a program stored in "a storage medium storing a program that makes a computer to obtain color correction conditions concerning a color original image to be readable wherein the computer is operated to divide a frame of the color original image into plural blocks each being composed of plural adjoining pixels, to evaluate the level of chroma of each divided block, to obtain first statistics between a density value of each primary color and the number of pixels showing the density value from each pixel of the color original image by reducing an influence of high chroma blocks in accordance with the evaluated level of chroma, to evaluate the level of chroma of each pixel of the color original image based on the first statistics, to obtain second statistics between a density value of each primary color and the number of pixels showing the density value by reducing an influence of high chroma pixels in accordance with the evaluated level of chroma, and to obtain color correction conditions concerning the color original image based on the second statistics is read, and executed by the computer, more accurate conditions for removing an influence of high chroma pixels can be obtained by reducing an influence of high chroma blocks whereby by obtaining aforesaid first statistics from a color original image, and an influence of more accurate high chroma pixels can be reduced (reducing most of those to be reduced in terms of influence as high chroma pixels) by obtaining aforesaid second statistics through reduction of an influence of high chroma pixels based on the first statistics. Therefore, it is possible to lower the possibility that the color correction conditions obtained based on the second statistics become color correction conditions generating images with poor color balance that is caused by an influence of high chroma pixels, if color correction is made by aforesaid color correction conditions, and thereby, it is possible to obtain color correction conditions for correcting colors to excellent color balance.

Explanation of Medium 5

When a program stored in "a storage medium described in Medium 4 wherein aforesaid color original image is an image having plural frames" is read, and executed by a computer, first statistics and second statistics are obtained from images on plural frames, and therefore, a possibility that a population of a sufficient amount of statistics can be obtained is high, and a possibility that color correction conditions for obtaining images with appropriate color balance can not be obtained is lower, thus, it is possible to obtain color correction conditions for correcting colors to excellent color balance.

Explanation of Medium 6

When a program stored in "a storage medium described in Medium 4 or 5 wherein aforesaid program makes the computer to operate to obtain prescribed second statistics by reducing an influence of high chroma pixels based on the first statistics from pixels of a color original image including pixels of a block whose influence has been reduced when obtaining the first statistics" is read, and executed by a computer, second statistics are obtained from pixels of an inputted color digital image including pixels of a block whose influence has been reduced when obtaining the first statistics. Therefore, a sufficient amount of statistics are easily secured and a possibility that color correction conditions for obtaining images with appropriate color balance can not be obtained is lower, thus, it is possible to obtain color correction conditions for correcting colors to excellent color balance.

A color original image is described as "a color image" in Japanese Patent Application No. 006574/1996. Color original images include a color image on a transmission type original such as a color negative film and a color positive film, a color image on a reflection type original such as a color print and a printed matter, and an electronic image of a color image such as a color analogue image like a video image signal obtained through image-pickup and a color digital image obtained by reading an original image by a digital camera or a digital scanner and by digitizing it.

A density value in the invention means a density value of an objective color, and it is a concept including density, reflectance, transmissivity, brightness, an inputted image signal level and an outputted image signal level.

Color correction in the invention is to correct a color balance of an object or a color original image to preferable colors or to colors which are felt to be preferable. Color correction conditions mean conditions for the color correction. In the case of exposure for printing, the color correction condition may be an amount of color correction for correcting an exposure amount for printing through LATD (large area transmittance density) control based on information obtained through image-pickup of a transmission type original. In the case of obtaining an outputted image from a color digital original image, the color correction condition may be either a certain amount of color correction to be added to or subtracted from a density value of each pixel, or function data for neutral color density value in an amount of color correction to be added to or subtracted from a density value of each pixel in accordance with the neutral color density value of each pixel, or others. Incidentally, an amount of color correction is one called "color correction amount" in the previous application.

Utilization of a color correction condition obtained by the invention from a color original image includes, when the color correction condition is an amount of color correction that corrects an exposure amount by LATD (large area transmittance density) control in exposure for printing, that an exposure amount is corrected by the obtained amount of color correction, and exposure for printing corresponding to the corrected exposure amount is given to a light-sensitive material for prints from a transmission type original for obtaining a print, and that, in the case of obtaining a hard copy from a color digital original image, an outputted image is obtained by correcting a color digital original image with the obtained color correction condition. When an outputted image is obtained through the invention, it is possible to obtain an image with excellent color balance such as a displayed image on a monitor or a hard copy, without taking any action on the outputted image or after processing it appropriately.

A color digital original image is described as "an inputted color digital image" in Japanese Patent Application No. 006574/1996, and it means a color digital image representing an original image. Color digital original images and outputted images (electronic images) are indicated by density, transmissivity or reflectance of each primary color. Color digital original images include a color digital image obtained through image-pickup of a color photographic original, color digital image obtained through image-pickup of an object conducted by a color digital camera, a color digital image obtained by reading a recording medium wherein color digital images are recorded, and a digital image obtained through A/D conversion of analogue signals (e.g., video signals). Incidentally, color photographic originals include a transparent film such as a processed color photographic film, a transmission type original such as one wherein color photographic images are formed on a transparent support such as a glass plate, and a reflection type original such as one wherein color photographic images are formed on an opaque support such as a sheet of paper. As a processed color photographic film, an ordinary one is a color photographic film obtained by forming latent images, through photographing, on a color photographic light-sensitive material that is composed of a transparent film support having thereon plural uniform light-sensitive layers each being photosensitive to light of different color component, and then by processing them.

The wording of high chroma means that chroma of an object is great. Statistics include statistical values such as a mean value, a median, a maximum value, a minimum value, a mode, a variance, and a standard deviation, and statistics showing the relation between values which are different each other. The statistics showing the relation between values different each other include a frequency distribution function showing the relation between a density value and an appearance frequency of the density value, a statistical function such as a cumulative density function, and statistics showing the relation between density values of plural different colors obtained from density values of each pixel in plural pixels.

A method to reduce an influence of high chroma blocks includes a method wherein chroma of each block is evaluated whether it is high chroma or not, and thereby blocks evaluated to be of high chroma are eliminated, a method wherein chroma of each block is evaluated whether it is high chroma or not, and an influence of blocks evaluated to be of high chroma is reduced, and a method wherein a chroma level of each block is evaluated for obtaining evaluation values, and an influence of high chroma blocks is reduced based on the evaluation values. A method for reducing an influence of high chroma pixels includes a method wherein chroma of each pixel is evaluated whether it is high chroma or not, and pixels evaluated to be of high chroma are eliminated, a method wherein chroma of each pixel is evaluated whether it is high chroma or not and an influence of pixels evaluated to be of high chroma is reduced, and a method wherein a chroma level of each pixel is evaluated for obtaining evaluation values, and an influence of high chroma pixels is reduced based on the evaluation value. For intent of reducing an influence of blocks or an influence of pixels, there are used methods wherein a weighting coefficient by which the blocks or the pixels are multiplied is brought near to zero and thereby frequency used for operation is reduced.

BRIEF DESCRIPTION OF THE DRAWINGS

FIG. 8 is a diagram showing an example of lookup table data for obtaining a conversion value for obtaining a weighting coefficient for pixels from a dominant amount of pixel color difference (green—blue, red—green) in Embodiment 2.

DETAILED DESCRIPTION OF THE PREFERRED EMBODIMENT

Concrete examples of the invention are shown below as embodiment to which the invention is not limited. In the embodiment, there are some conclusive expressions for terminology, and they are for preferable examples of the invention, and terminology of the invention are not limited by them in terms of meaning and technical scope.

Embodiment 1

An image system of the present embodiment is an example of a system for processing a color digital image which is a color original image in terms of color balance reproduction and for obtaining an outputted image, and it is a system wherein when a container (hereinafter referred to as a cartridge) complying with JIS 135 Standard for containing a silver halide color negative photographic light-sensitive film for photographing use which contains a long roll silver halide color negative photographic light-sensitive film for photographing use having a B (blue)-sensitive Y (yellow) color forming layer, a G (green)-sensitive M (magenta) color forming layer, and an R (red)-sensitive C (cyan) color forming layer and complying with JIS 135 Standard on which plural frames are recorded longitudinally (hereinafter referred to as a film) exposed by an operator who is one of many and unspecified end users, is inserted through an inlet of the present system, the present system processes the film automatically and obtains photographed inputted color digital image which is then subjected to color balance reproduction processing, thus, an outputted image is obtained, then, a photographic paper that is a silver halide color photographic light-sensitive material having a B-sensitive Y color forming layer, a G-sensitive M color forming layer and an R-sensitive C color forming layer (hereinafter referred to as photographic paper) is exposed to the image-processed image through scanning, and an exposed photographic paper is processed to turn into a print and is sorted. An apparatus of the present embodiment will be explained in detail as follows.

Figure 1:
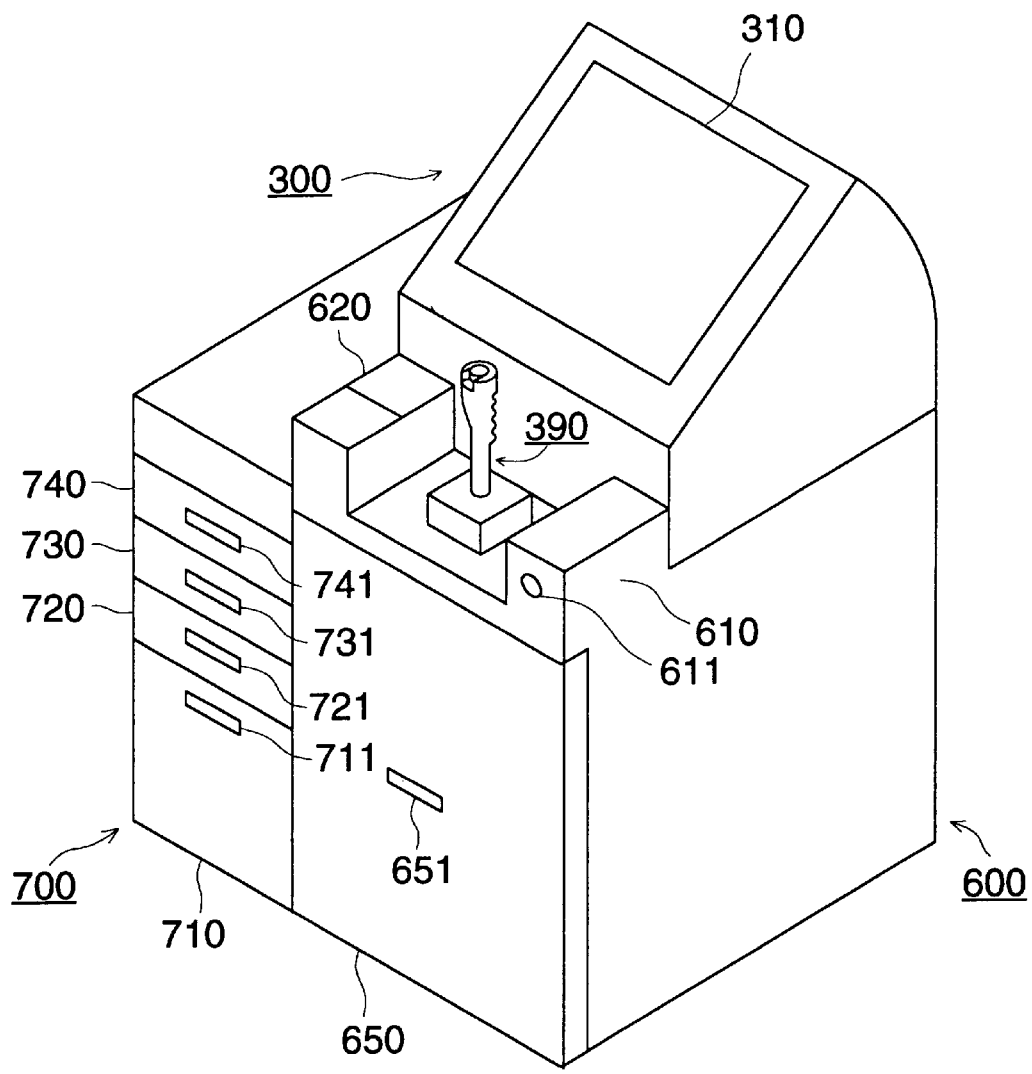
FIG. 1 is an exterior view of an overall image system in Embodiment 1.
Figure 2:
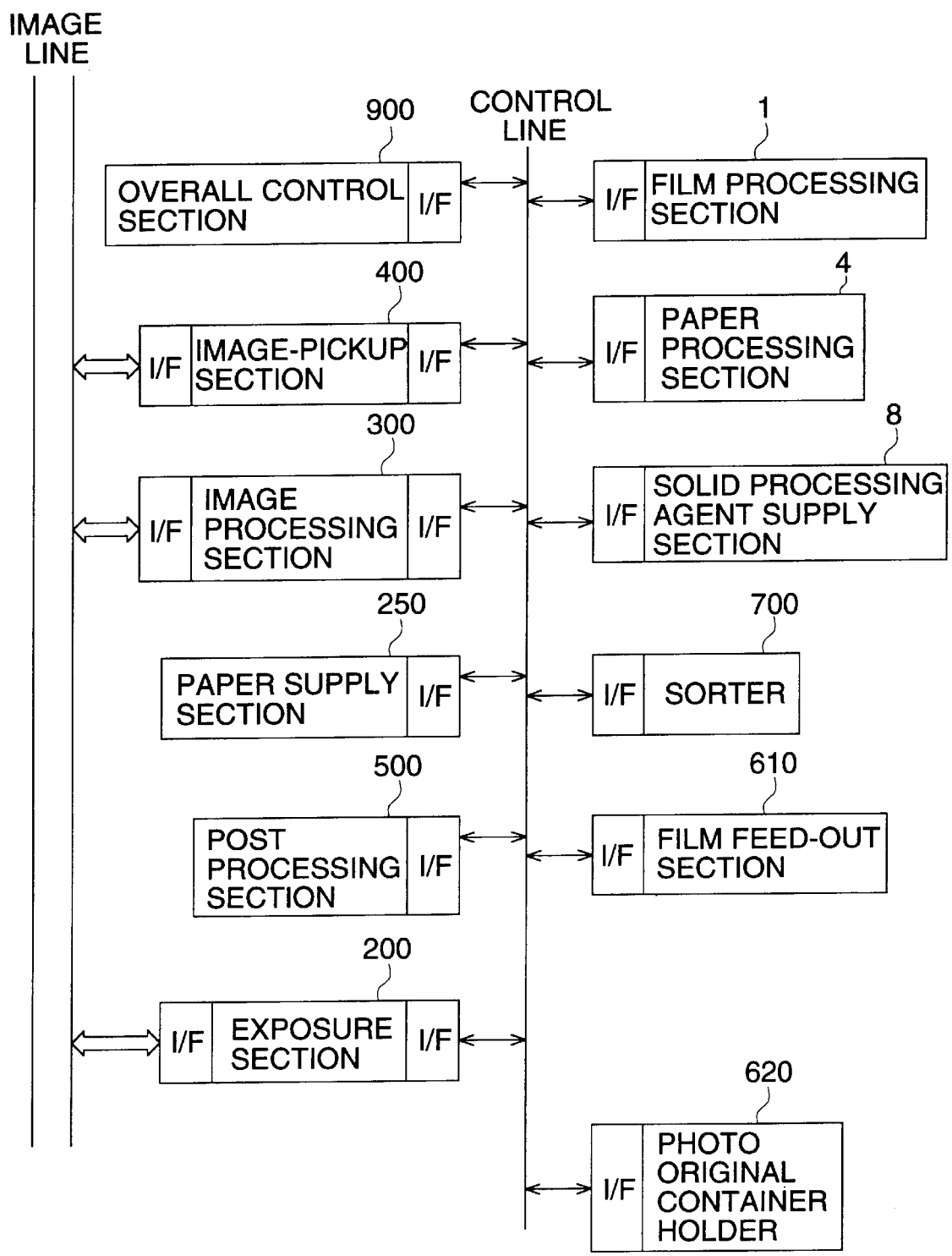
FIG. 2 is an overall block diagram of Embodiment 1.
Figure 3:
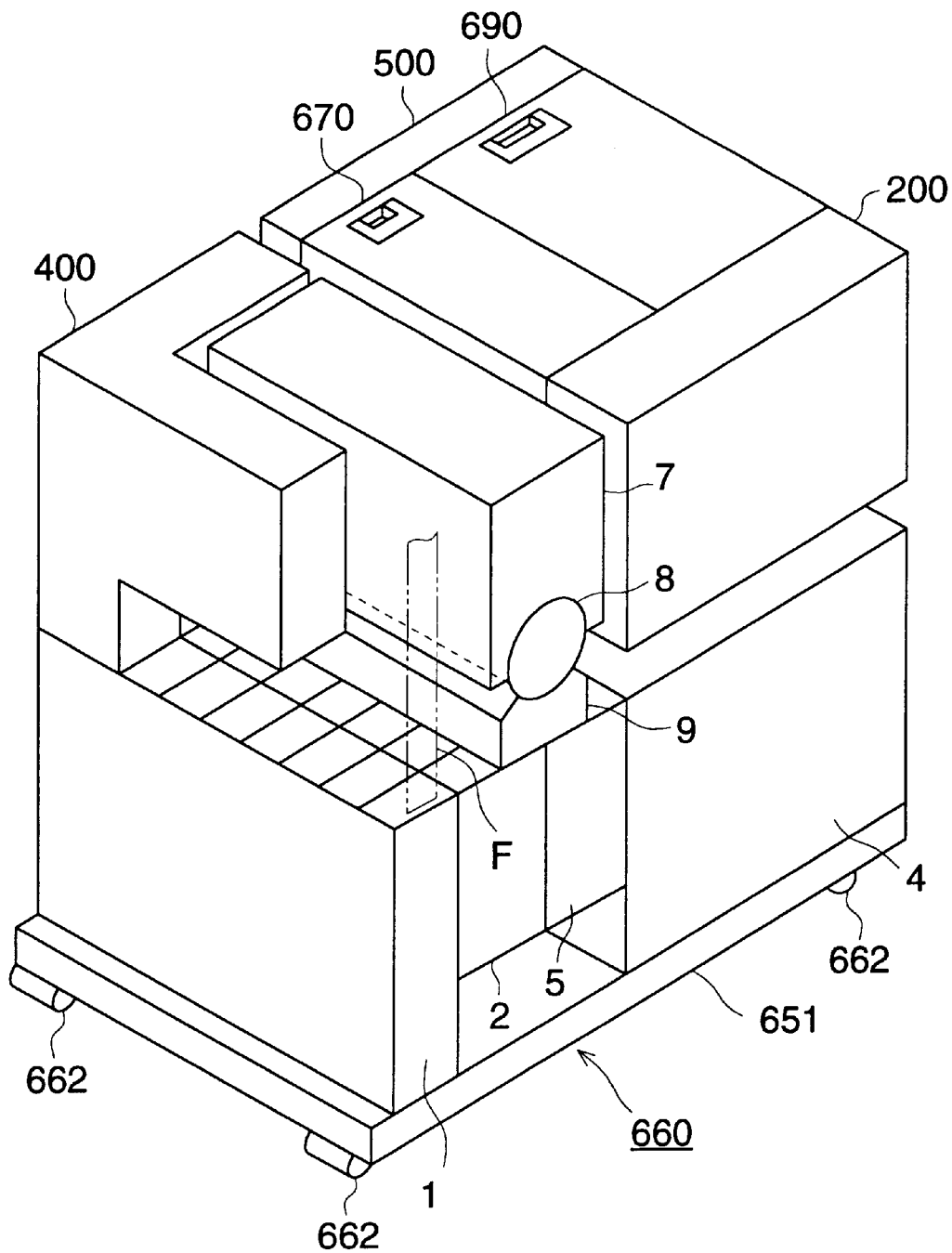
FIG. 3 is a perspective view of an apparatus main body in Embodiment 1.

As shown in an exterior view of FIG. 1, an overall block diagram of FIG. 2 and a perspective view of an apparatus main body 660 of FIG. 3, an image system of the present embodiment is an image system having therein film feed-out section 610 that feeds a film contained in a cartridge inserted by an operator through inlet 611 out of the cartridge, film processing section 1 which processes the fed out film through impregnation developing to turn it into a photographic original, image-pickup section 400 which picks up images from the photographic original obtained in the film processing section 1 and conducts A/D conversion and logarithmic conversion to obtain an inputted color digital image, image processing section 300 which conducts color correction from the color digital original image coming from the image-pickup section 400 and outputs the obtained outputted image, monitor 310 which displays the outputted image coming from the image processing section 300, paper supply section 250 (covered by exposure section 200 and is invisible in FIG. 3) that supplies photographic paper to exposure section 200 from magazine 670 or 690, exposure section 200 wherein photographic paper supplied from the paper supply section 250 is exposed to the outputted image coming from the image processing section 300, paper processing section 4 wherein the photographic paper exposed in the exposure section 200 is processed through impregnation developing and is turned into a print, after-treatment section 500 which conducts after-treatment such as measurement of density of the print obtained at the paper processing section 4 and others, sorter 700 that sorts photographic originals subjected to image-pickup in the image-pickup section 400 and prints coming from the after-treatment section 500 for each order, solid processing agent supply section 8 that supplies solid processing agents to auxiliary tank 2 of the film processing section 1 and auxiliary tank 5 of the paper processing section 4 from solid processing agent container 7 through solid processing agent guide 9, and overall control section 900 that controls entirely. Above-mentioned sections are connected to each other with control lines. The image-pickup section 400, the image processing section 300 and the exposure section 200 are connected with image data lines (abbreviated as image lines in the figure). The image processing section 300 has therein monitor 310 that displays images to be displayed and instruction-inputting section 390 on which an operator inputs instructions. Since prints and photographic originals in the same order are delivered to sorter bins 710, 720, 730 and 740 in the sorter 700, it is easy to take them out, and failure to take them out can be prevented. On output ports of sorter bins, there are provided covers 711, 721, 731 and 741 each being provided with a handle. Apparatus main body 660 is enclosed by outer frame 600, and the apparatus main body 660 can be taken out of the outer frame when door 650 which is located at the front thereof and is equipped with handle 651 is opened.

In the color correction in this case, an amount of color correction is obtained from color digital original images on one roll of film or on one frame, and an amount of color correction thus obtained is actuated on the color digital original images, in which there can be reduced the troubles of color correction caused in a conventional method when most of the color digital original images are biased to a certain color.

Each frame is divided into blocks in prescribed quantity of Mf. Each block is composed of pixels in prescribed quantity of N. Incidentally, each frame on a film is to be divided into two or more, and it is preferable that it is divided into 1 to 64 longitudinally and also laterally. Based on the block, all pixels in the same block are given the same weighting for each block and statistics are taken, thus, there are obtained first statistics which are close to statistics obtained based on pixels to be made achromatic. Then, based on the first statistics, statistics are obtained by giving different weighting to each pixel, and then, there are obtained second statistics which are closer to statistics obtained based on pixels to be made achromatic. Then, an amount of color correction is obtained based on the second statistics.

In this case, when one frame is divided into at least two blocks, the effect of the invention can be exhibited. For example, the invention is effective for a color digital original image wherein an upper half of a frame is a blue sky. Further, from the viewpoint of a calculation amount and saturation of the effect of the invention, it is preferable that each frame on a film is divided into blocks in prescribed quantity of 64×64 or less.

Incidentally, in the following explanation of the present embodiment, an amount of color correction is obtained from color digital original images on one frame of a film, in which the first frame primary color density value cumulative density function is calculated as the first statistics, and the second frame primary color density value cumulative density function is calculated as the second statistics. This method of obtaining an amount of color correction will be explained in detail as follows.

Figure 4:
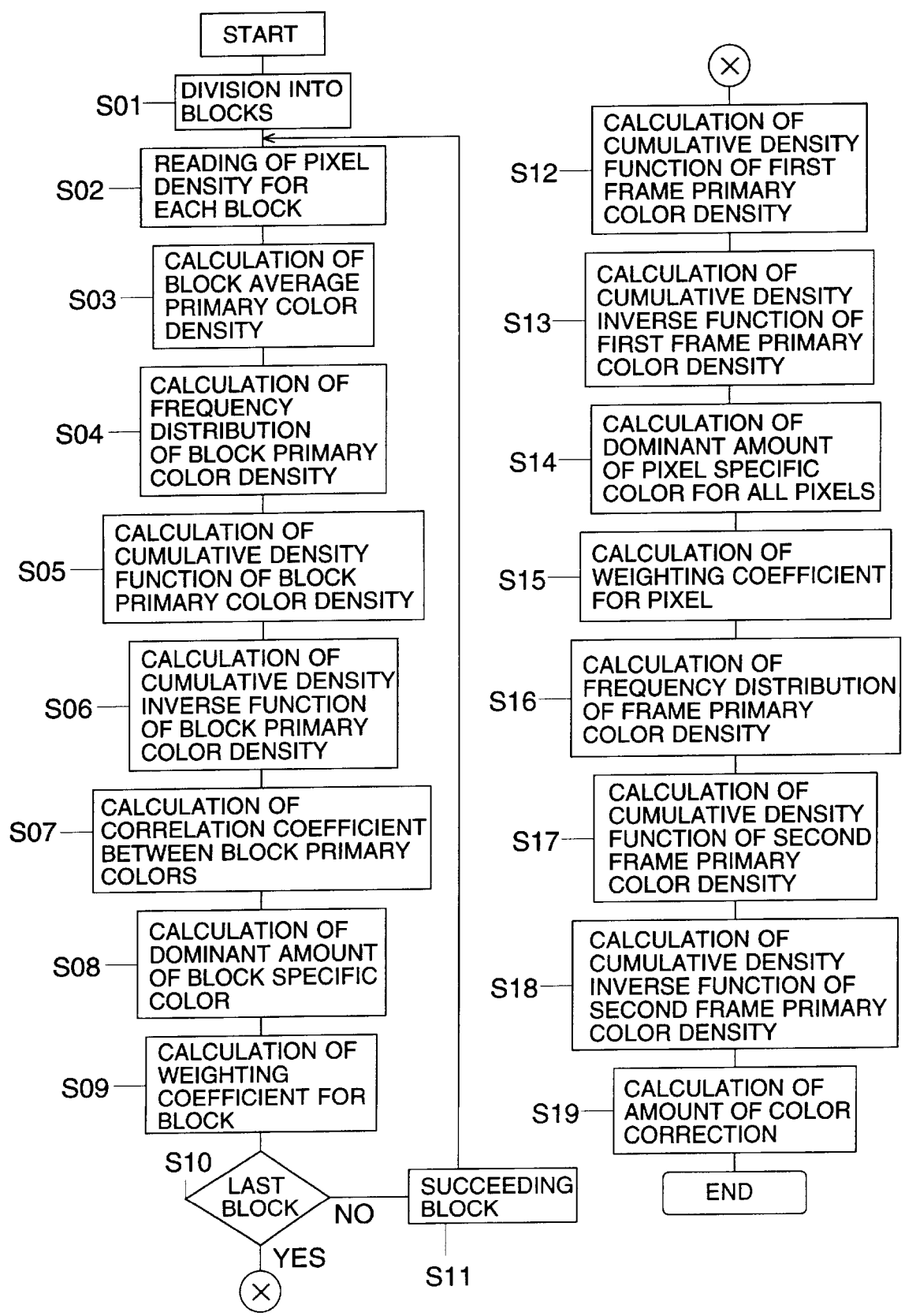
FIG. 4 is a flow chart for obtaining an amount of color correction in Embodiment 1.

In a flow chart for obtaining an amount of color correction in FIG. 4, each frame is divided at regular intervals longitudinally into blocks in quantity of Mf (e.g., Mf=5) in step S01. Let it be assumed that the number of pixels in each block is N. Namely, the number (m) of the block in terms of position (i, j) to which pixel (xy) of each frame belongs is determined. The symbol m represents an order of a block in the film, and it shows that the block is the m-th one to be read. In this case, m is established to be 1. Hereinafter, a block to be read in m-th order in the film is called the m-th block.

$$m \leftarrow 1$$

Next, in step S02, density of each primary color of B, G and R of a pixel of m-th block [X (k, m, i, j)] (k=B, G, R: m=1–Mf) is read and is set to RAM which makes access of higher speed possible. In the following explanation, mantissas i and j are the values related to the pixel that is positioned at i-th line and j-th row in each block. The symbol k represents each of primary colors B, G and R.

In step S03, block mean primary color density AVE (k,m) (k=B, G, R: m=1–Mf) that is a mean value of pixel density related to each of primary colors B, G and R in m-th block of the film is calculated. This value is used for obtaining frame mean primary color density AVE (k) later.

$$AVE(k, m) \leftarrow \frac{\sum_{i,j} x(k, m, i, j)}{N}$$

In step S04, block primary color density frequency distribution FRQ (k, m, s) (k=B, G, R: m=1–Mf) that is a frequency distribution of density is related to each primary color of B, G and R in m-th block is calculated.

$$FRQ(k, m, s) \leftarrow \sum_{i,j} EQ(s, X(k, m, i, j))$$

In the above expression, S represents density, and EQ (p, q) represents a function which gives 0 when numerical values p and q are the same and gives 0 when they are not the same.

In steps S05 through S09, a cumulative density function of a block is used for evaluating the level of high chroma of the block, and a dominant amount of a block specific color which is represented by the value of aforesaid evaluation can be obtained.

In step S05, there is obtained block primary color density value cumulative density function CDF (k, m, s) (k=B, G, R: m=1–Mf) which is a cumulative density function of density related to each color of B, G and R of m-th block from aforesaid block primary color density frequency distribution FRQ (k, m, s) (k=B, G, R: m=1–Mf). Incidentally, a function value of the block primary color density value cumulative density function CDF (k, m, s) (k=B, G, R: m=1–Mf) may either be one showing a percentage of the cumulative number of pixels whose density is not more than s, or be one showing the cumulative number of pixels whose density value is not more than s, and the following explanation will be made, using the cumulative number of pixels.

$$CDF(k, m, s) \leftarrow \sum_{t=0}^{s} FRQ(k, m, t)$$

In aforesaid expression, t is a mantissa for integration.

In step S06, there is obtained block primary color density value cumulative density inverse function CDF (k, m, z) (k=B, G, R: m=1–Mf) which is an inverse function related to density s on the occasion that a cumulative density function related to each of primary colors B, G, and R of m-th block from aforesaid block primary color density value cumulative density function CDF (k, m, s) (k=B, G, R: m=1–Mf) is made to be z=CDF (k, m, s) (k=B, G, R: m=1–Mf).

$$RCDF(k, m, z) \leftarrow CDF^{-1}(k, m, s)$$

k: B, G, R m: 1–Mf

Function value Y may take either all integer values which exceed 0 and are less than N (number of all pixels in block), or the thinned out values. However, for reducing processing thereafter, values such as 16, 24, . . . , 232 and 240 representing a multiple of 8 were taken.

In step S07, there is obtained, concerning m-th block, inter-block-primary-colors correlative coefficient CC (k, u, m) (k≠u: B, G, R: m=1–Mf) which is a correlative coefficient between primary colors of B, G and R of m-th block from the value of block primary color density value cumulative density inverse function CDF (k, m, z) (k=B, G, R: m=1–Mf)

$$CC(k, u, m) \leftarrow \frac{Cov(RCDF(k, m, z), RCDF(k, m, z))}{\sqrt{Var(RCDF(k, m, z) \times Var(RCDF(k, m, z))}}$$

$z : 16, 24, \cdots 232, 240$ $k \neq u : B, G, R$

In above expression, CC (k, u, m) (k≠u: B, G, R: 1–Mf) is a correlative coefficient between colors of BG, GR and RB of the block primary color density value cumulative density inverse function, and Cov (p, q) shows covariance of p and q, while, Var (p) shows dispersion of p.

This CC (k, u, m) (k≠u: B, G, R: 1–Mf) is one reflecting a difference of a shape between colors of B, G, and R of the cumulative density function. The reason for this is that when a frame is of high chroma, a shape of the cumulative density function for only a specific color is extremely different from others, and therefore, a difference in shape of the cumulative density function between the specific color and other primary colors grows greater, and this correlative coefficient CC (k, u, m) (k≠u: B, G, R: 1–Mf) becomes smaller. Since a difference in shape of the cumulative density function between primary colors other than the specific color is small, on the other hand, the correlative coefficient between primary colors other than the specific color becomes greater. Therefore, a difference between the maximum correlative coefficient and the minimum correlative coefficient becomes greater, and thereby a difference between correlative coefficients becomes greater.

In step S08, an amount of evaluation for domination of a specific color in m-th block, namely, block specific color dominant amount CD (m) (m=1–Mf) which is an amount of evaluation for evaluating the degree of high chroma of the m-th block is obtained from the correlative coefficient CC (k, u m) (k≠u: B, G, R: 1–Mf) between colors of BG, GR and RB of the m-th block thus obtained.

Mx (m)←Max (CC (B, G, m), CC (G, R, m), CC (R, B, m))

Mn (m)←Min (CC (B, G, m), CC (G, R, m), CC (R, B, m))

CD (m)=Mx (m)−Mn (m)

In the foregoing, Max (p,q,r) is a function giving the maximum value of p, q and r, while, Min (p,q,r) is a function giving the minimum value of p, q and r.

When the block specific color dominant amount CD (m) (m=1–Mf) thus obtained is great, it shows that domination by the specific color is strong, namely, that the block is high chroma.

In step S09, there is obtained block weighting coefficient α (m) (m=1–Mf) which represents how an influence of the m-th block can be reduced from the block specific color dominant amount CD (m) (m=1–MF) that is an evaluation value evaluating the degree of high chroma of the m-th block. Namely, for intent of obtaining the prescribed first statistics by reducing an influence of a high chroma block, block weighting coefficient α (m) (m=1–Mf) that is a weighting coefficient for the m-th block is determined in accordance with lookup table $LUT_1$ that conducts non-linear transformation for the m-th block specific color dominant amount CD (m) (m=1–Mf).

$$\alpha(m) \leftarrow LUT_1(CD(m))$$

Figure 5:
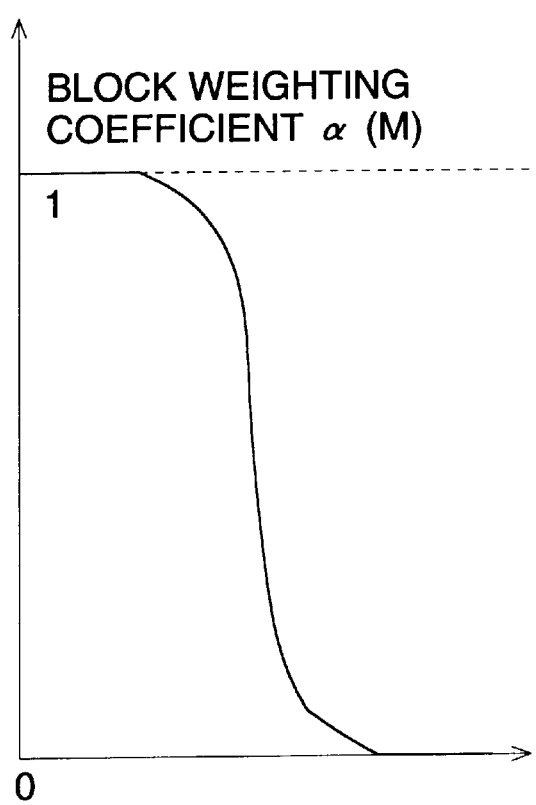
FIG. 5 is a diagram showing an example of lookup table data for obtaining a weighting coefficient for blocks from a dominant amount of block specific color in Embodiment 1.

FIG. 5 shows an example of data of the $LUT_1$. In the figure, the axis of abscissa represents block specific color dominant amount CD (m), and the axis of ordinate represents block weighting coefficient α (m). In this case, a value of the block weighting coefficient α (m) takes values in a range from 0 to 1. However, when domination of the specific color is strong, namely, when the block specific color dominant amount CD (m) is great, the block weighting coefficient α (m) takes a value which is close to 0 which is not used much for obtaining the first statistics, while, when domination of the specific color is weak, namely, the block specific color dominant amount CD (m) is close to 0, the block weighting coefficient α (m) takes a value which is close to 1 which is used fully for obtaining the first statistics. In this way, it is possible to obtain the prescribed first statistics by reducing an influence of a block of high chroma based on block specific color dominant amount CD (m).

In step S10, judgment is made whether the operated block is the last block Mf in color digital original images of a photographic film frame or not, and when it is the last block (illustrated Yes), following step S12 is executed, and when it is not the last block (illustrated No), the sequence advances to step S11. Incidentally, Mf represents (the number of each frame: 5).

In step S11, 1 is added to constant m for the operation of the succeeding block, and processes for step S02 and thereafter are executed again.

m←m+1

In the aforesaid manner, block primary color density frequency distribution FRQ (k, m, s) (k=B, G, R: m=1–Mf) and block weighting coefficient a (m) (m=1–Mf) are obtained for all blocks of inputted digital images of a photographic film.

In subsequent step S12, first frame color density value cumulative density function $FCDF_1$ (k, s) (k=B, G, R) can be obtained from aforesaid block primary color density frequency distribution FRQ (k, m, s) (k=B, G, R: m=1–Mf) by the following expression for all density values s for each primary color.

$$FCDF_1(k, s) \leftarrow \sum_{m=0}^{Mf}\left[\alpha(m) \times \sum_{t=0}^{s} FRQ(k, m, t)\right]$$

$(k = B, G, R)$

Through aforesaid manner, first frame primary color density value cumulative density function $FCDF_1$ (k, s) (k=B, G, R) which represents the prescribed first statistics can be obtained from density of each primary color of pixels of all blocks in one frame of color digital original images of a photographic film.

Figure 6:
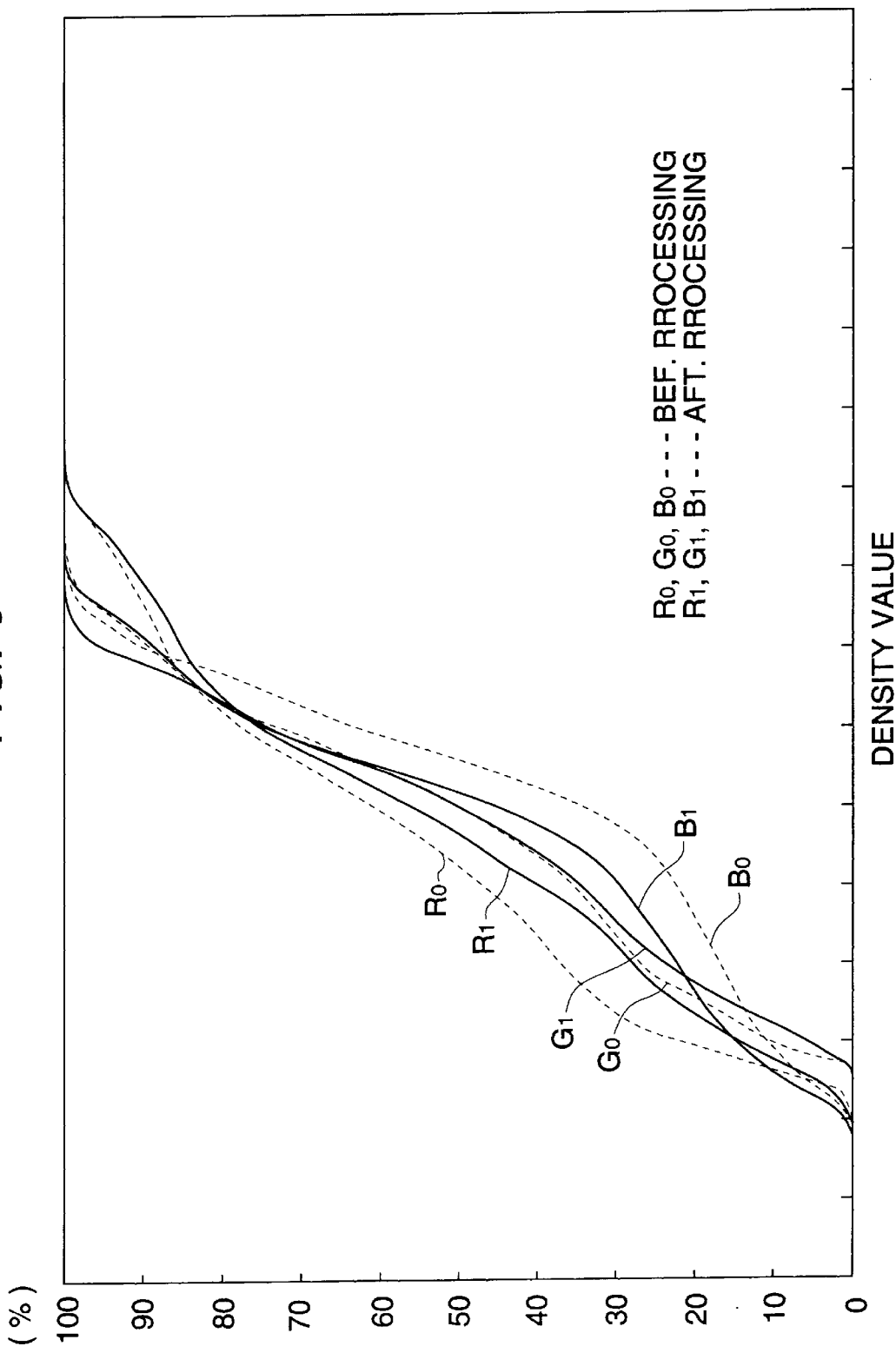
FIG. 6 a diagram showing an example of a frame primary color density value cumulative density function.

FIG. 6 shows an example of statistics based on a frame density value cumulative density function. In FIG. 6, each of dotted line curves $R_0$, $G_0$ and $B_0$ represents a frame density value cumulative density function obtained in advance of aforesaid processing (step S01 through step S10) of the invention, namely obtained before reducing an influence of a block of high chroma. On the other hand, each of dotted line curves $R_1$, $G_1$ and $B_1$ represents a first frame density value cumulative density function obtained in step S12 after aforesaid processing of the invention, wherein an influence of a block of high chroma is reduced. As is clear from the figure, a density value cumulative density function for each color approximates, owing to aforesaid processing of the invention, to the density value cumulative density function obtained based on pixels which come to be linear and are to be made achromatic.

Then the sequence advances to step S13 where there can be obtained first frame primary color density value cumulative density inverse function $RFCDF_1$ (k, z) (k=B, G, R) which is an inverse function, with regard to density s, of aforesaid first frame primary color density value cumulative density function $FCDF_1$ (k, s) (k=B, G, R) that is aforesaid prescribed first statistics.

$$RFCDF_1\ (k, z) \leftarrow FCDF_1^{-1}\ (k, s)$$

k: B, G, R z: 1, 2, 3, . . . , N

Here, z represents a plurality of cumulative density function values determined in advance, and it takes all values which are more than the minimum value 0 and are less than the maximum value N (the number of pixels of image density information), which is different from z in step S06.

In step S14, densities X of respective primary colors (k, m, i, j) (k=B, G, R: m=1–Mf) are read out of RAM, for all detected pixels of one frame of a photographic film including pixels of the blocks whose influence have been reduced. By the use of densities X of respective primary colors (k, m, i, j) (k=B, G, R: m=1–Mf) of respective pixels, first frame primary color density value cumulative density inverse function $RFCDF_1$ (k, z) (k=B, G, R) and first frame primary color density value cumulative density function $FCDF_1$ (k, s) (k=B, G, R), color balance of respective pixels are evaluated through calculation of the following expression, for all pixels including pixels of the block of high chroma, and further, there is obtained pixel specific color dominant amount PCD that is an evaluation value with which the extent of high chroma of each pixel is evaluated. To be concrete, pixel specific color dominant amount PCD (m, i, j) (m=1–Mf) that is an evaluation value of domination by specific colors in pixels (i, j) of M-th block, namely is an evaluation value with which the extent of high chroma is evaluated.

$$RF\ (B, m) \leftarrow RFCDF_1\ (B, RCDF_1\ (G, X(G, m, i, j)))$$

$$RF\ (R, m) \leftarrow RFCDF_1\ (R, RCDF_1\ (G, X(G, m, i, j)))$$

$$PCD\ (m, i, j) \leftarrow X\ (B, m, i, j) - RF\ (B, m) + X\ (R, m, i, j) - RF\ (R, m)$$

As an example, in aforesaid calculation, calculated blue density value RF (B) and a calculated red density value are calculated based on green density value X (G) for each pixel, from first frame primary color density value cumulative density function FCDF1 and first frame primary color density value cumulative density inverse function RFCDF1 in each of which an influence of a block of high chroma is reduced as shown in FIG. 6, and then, deviation (X (B)–RF (B)) between blue density value X (B) of a pixel and calculated blue density value RF (B) and deviation (X (R)–RF (R)) between red density value X (R) of a pixel and calculated red density value RF (R) are obtained, and further, pixel specific color dominant amount PCD is calculated in accordance with a size of the deviation. Thus, a pixel weighting coefficient is determined from the pixel specific color dominant amount PCD through step S15 described below so that an influence of a pixel of high chroma may be reduced.

In step S15, pixel weighting coefficient β (m, i, j) (m=1–Mf) is obtained from pixel specific color dominant amount PCD (m, i, j) (m=1–Mf) of pixel (i, J) in m-th block, for all detected pixels including pixels of high chroma blocks and for pixel (i, j) in a block of each m-th block.

$$\beta\ (m, i, j) \leftarrow LUT_2\ (PCD\ (m, i, j))$$

Figure 7:
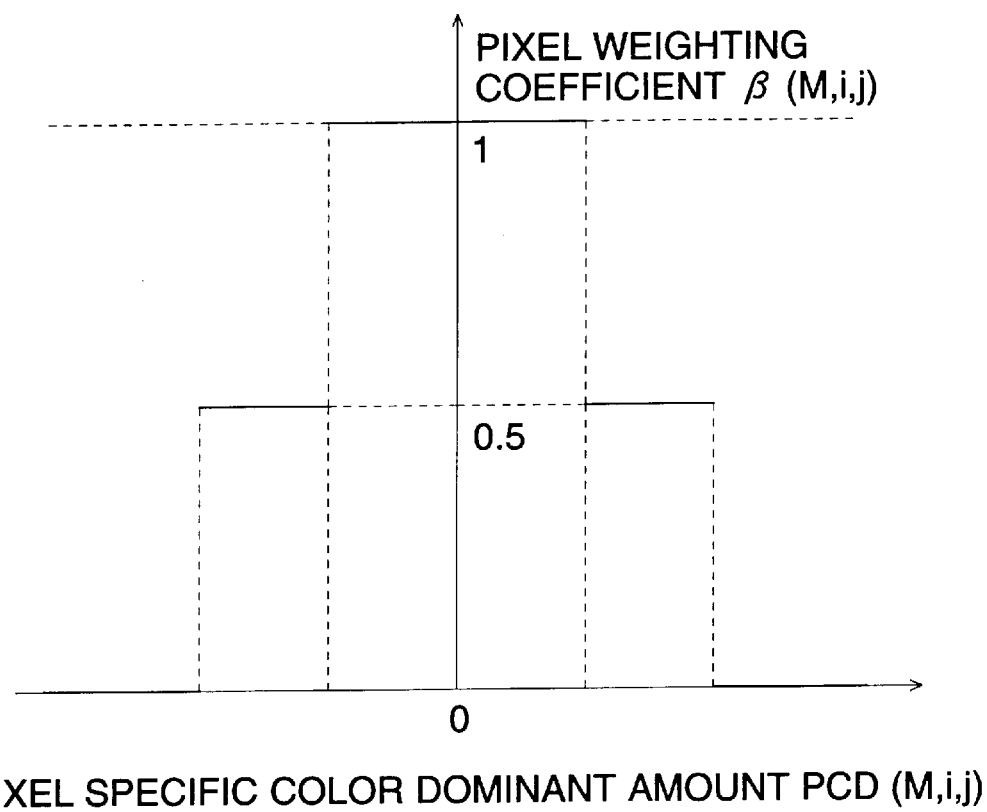
FIG. 7 is a diagram showing an example of lookup table data for obtaining a weighting coefficient for pixels from a dominant amount of pixel specific color in Embodiment 1.

An example of data of the $LUT_2$ is shown in FIG. 7 wherein the axis of abscissa represents pixel specific color dominant amount PCD (m, i, j) and the axis of ordinate represents pixel weighting coefficient β (m, i, j). In this case, a value of the pixel weighting coefficient β (m, i, j) takes values within a range from 0 to 1, and a function is stepwise so that operation thereafter may be simple, because a weighting coefficient is obtained for each pixel. When domination of a specific color in a certain pixel, for example, in pixel (I, J) of m-th block, is high, pixel specific color dominant amount PCD (m, i, j) grows greater positively or negatively. When the pixel specific color dominant amount PCD (m, i, j) grows greater than a prescribed range at a broader side positively or negatively, the pixel weighting coefficient β (m, i, j) becomes 0 which is not referred to at all. When domination of a specific color in pixel (i, j) of m-th block is low, pixel specific color dominant amount PCD (m, i, j) grows to be near 0. When the pixel specific color dominant amount PCD (m, i, j) enters a prescribed range on the narrower side that is near 0, the pixel weighting coefficient takes a value of 1 which is consulted to the utmost. Though the pixel specific color dominant amount PCD (m, i, j) is out of the prescribed range at the narrower side in the present embodiment, when it is within a prescribed range at the broader side, the pixel weighting coefficient takes a value of 0.5.

Then, in step S16, frame primary color density frequency distribution $FRQ_2$ (k, s) (k=B, G, R) which is frequency distribution of density related to each primary color of B, G and R for all color digital original images in one frame is calculated from each primary color density X (k, m, i, j) (k=B, G, R: m=1–Mf) and pixel weighting coefficient β (m, i, j) (m=1–Mf)

$$FRQ_2(k, s) \leftarrow \sum_m \left( \sum_{i,j} (\beta(m, i, j) \times EQ(s, X(k, m, i, j))) \right)$$

In aforesaid expression, S represents density and EP (p, q) represents a function that gives 1 when numeral values p and q are the same each other and gives 0 when they are not the same.

In step S17, second frame primary color density value cumulative density function $FCDF_2$ (k, s) (k=B, G, R) which is a cumulative density for density of each primary color in pixels of all blocks of color digital original images in one frame of a photographic film corresponding to the second statistics of the invention is obtained from a frame primary color density distribution.

$$FCDF_2(k, s) \leftarrow \sum_{t=0}^{s} FRQ_2(k, t)$$

In the method mentioned above, the second frame primary color density value cumulative density function $FCDF_2$ (k, s) (k=B, G, R) which represents prescribed second statistics can be obtained by reducing an influence of high chroma pixels based on pixel specific color dominant amount PCD (m, i, j) (m=1–Mf).

Then, the sequence advances to step S18 wherein the second frame primary color density value cumulative density inverse function $RFCDF_2$ (k, z) (k=B, G, R) which represents an inverse function relating to density s of aforesaid second frame primary color density value cumulative density function $FCDF_2$ (k, s) (k=B, G, R) can be obtained.

$$RFCDF_2 (k, z) \leftarrow FCDF_2^{-1} (k, s)$$

In the foregoing, z takes all of integer values which are greater than 0 and are not more than N×Mf (the number of pixels of image density information) Next, in step S19, there is obtained, as shown in the following expression, frame mean primary color density AVE (k) (k=B, G, R) from which frame green-blue color dominant amount $PCD_{GB2}$ representing an evaluation value of color domination in green-blue of the corresponding frame and frame red-green color dominant amount $PCD_{GR2}$ representing an evaluation value of color domination in red-green are obtained, using aforesaid second frame primary color density value cumulative density function $FCDF_2$ (k, s) (k=B, G, R) and second frame primary color density value cumulative density inverse function $RFCDF_2$ (k,z) (k=B, G, R), and then, color correction amount Ec (k) (k=B, G, R) for three primary colors of the corresponding frame can be obtained.

$$AVE(k) \leftarrow \sum_m AVE(k, m) / Mf$$

$$PCD_{GB2} \leftarrow AVE(B) - RFCDF_2(B, FCDF_2(G, AVE(G)))$$

$$PCD_{GR2} \leftarrow AVE(R) - RFCDF_2(R, FCDF_2(G, AVE(G)))$$

$$Ec(B) \leftarrow 0.67 \times PCD_{GB2} - 0.33 \times PCD_{GR2}$$

$$Ec(G) \leftarrow -0.33 \times PCD_{GB2} - 0.33 \times PCD_{GR2}$$

$$Ec(R) \leftarrow -0.33 \times PCD_{GB2} + 0.67 \times PCD_{GR2}$$

$$PCD_{GB2} \leftarrow AVE(B) - RFCDF_2(B, FCDF_2(G, AVE(G)))$$

$$PCD_{GB2} \leftarrow AVE(R) - RFCDF_2(R, FCDF_2(G, AVE(G)))$$

$$Ec(B) \leftarrow 0.67 \times PCD_{GB2} - 0.33 \times PCD_{GR2}$$

$$Ec(G) \leftarrow -0.33 \times PCD_{GB2} - 0.33 \times PCD_{GR2}$$

$$Ec(R) \leftarrow -0.33 \times PCD_{GB2} + 0.67 \times PCD_{GR2}$$

In the above-mentioned method, color correction amounts (Ec (B), Ec (G), Ec (R)) are obtained.

Then, mean density (BM, GM, RM) are obtained from density (X (x, y, B), X (x, y, G) and X (x, y, R)) of each pixel (x, y) of color digital original images in each frame. Then, density X (x, y, k) (k=B, G, R) of each pixel (x, y) of color digital original images in each frame are corrected by the following expressions, and outputted images (Y (x, y, B), Y (x, y, G) and Y (x, y, R)) having color balance corrected excellently are obtained accordingly.

$$Y (x, y, B) = X (x, y, B) - BM + Ec (B)$$

$$Y (x, y, G) = X (x, y, G) - BM + Ec (G)$$

$$Y (x, y, R) = X (x, y, R) - BM + Ec (R)$$

When a photographic paper is exposed by exposure section 200 to outputted image obtained through aforesaid color correction and when the exposed photographic paper is processed to be a print through impregnation development by paper processing section 4, both being in image processing section 300, a print having excellent color balance can be obtained. Further, when the outputted image obtained through aforesaid color correction is displayed on monitor 310 in the image processing section 300, a monitor image having excellent color balance can be displayed.

As a variation of Embodiment 1, a color correction method in Embodiment 1 may also be used for obtaining an amount of color correction for correcting an exposure amount through LATD control in a photographic exposure apparatus which gives exposure to a photographic paper based on an exposure amount based on the LATD control.

In this case, the final exposure amount is obtained by adding an amount of color correction obtained through the color correction method in Embodiment 1 to an exposure amount based on the LATD control. When the obtained exposure amount is used for giving exposure to a photographic paper in the photographic exposure apparatus, the exposed photographic paper turns into a print having excellent color balance, after being processed.

Embodiment 2

Embodiment 2 is the same as Embodiment 1 except the following points.

In place of steps S14 and S15 in Embodiment 1, pixel green-blue color dominant amount $PCD_{GB}$ (m, i, j) (m=1–MF) that is an evaluation amount of color domination between green and blue colors of pixels (i, j) in m-th block and pixel red-green color dominant amount $PCD_{GR}$ (m, i, j) (m=1–MF) that is an evaluation amount of color domination between red and green colors are obtained from density X (k, m, i, j) (k=B, G, R: m=1–Mf) of each primary color, using first frame primary color density value cumulative density function $FCDF_1$ (k, s) (k=B, G, R) and first frame primary color density value cumulative density inverse function $RFCDF_1$ (k, z) (k=B, G, R), as shown in the following expressions. Then, pixel green-blue color dominant amount $PCD_{GB}$ (m, i, j) (m=1–Mf) and pixel red-green color dominant amount $PCD_{GR}$ (m, i, j) (m=1–Mf) are transformed by LUT independently. After that, a value obtained through the transformation mentioned above is multiplied by the other value obtained also through the transformation to obtain pixel weighting coefficient β (m, i, j) (m=1–Mf).

$$RF (B, m) \leftarrow RFCDF_1 (B, FCDF_1 (G, X (G, m, i, j)))$$

$$RF (R, m) \leftarrow RFCDF_1 (R, FCDF_1 (G, X (G, m, i, j)))$$

$$PCD_{GB} (m, i, j) \leftarrow X (B, m, i, j) - RF (B, m)$$

$$PCD_{GR} (m, i, j) \leftarrow X (R, m, i, j) - RF (R, m)$$

$$\beta (m, i, j) \leftarrow LUT_B (PCD_{GB} (m, i, j) \times LUT_R (PCD_{GR} (m, i, j))$$

In this case, $LUT_B$ and $LUT_R$ represent a lookup table, and both of them may be either different each other or the same, as an example thereof is shown in FIG. 8. In FIG. 8, the axis of abscissa represents pixel green-blue color dominant amount and pixel red-green color dominant amount, while, the axis of ordinate represents values of $LUT_B$ and $LUT_R$. The relation between the pixel green-blue color dominant amount and $LUT_B$ is shown in the upper diagram, and the relation between the pixel red-green color dominant amount and $LUT_R$ is shown in the lower diagram. In this case, a value of a pixel weighting coefficient takes values in a range from 0 to 1, and when domination of a specific color in pixel (i, j) of m-th block is high, pixel green-blue color dominant amount or pixel red-green color dominant amount grows greater positively or negatively, and $LUT_B$ or $LUT_R$ takes a value of 0. As a result, a value of a pixel weighting coefficient takes 0 which is not consulted at all, while when domination of a specific color in pixel (i, j) of m-th block is low, pixel green-blue color dominant amount and pixel red-green color dominant amount grow to be near 0 and $LUT_B$ and $LUT_R$ take a value of 1. As a result, a value of a pixel weighting coefficient takes 1 which is consulted to the utmost.

Though an evaluation amount is obtained with green serving as a standard in Embodiment 2, an evaluation amount may also be obtained with a standard of red or blue in place of green.

Embodiment 3

Figure 9:
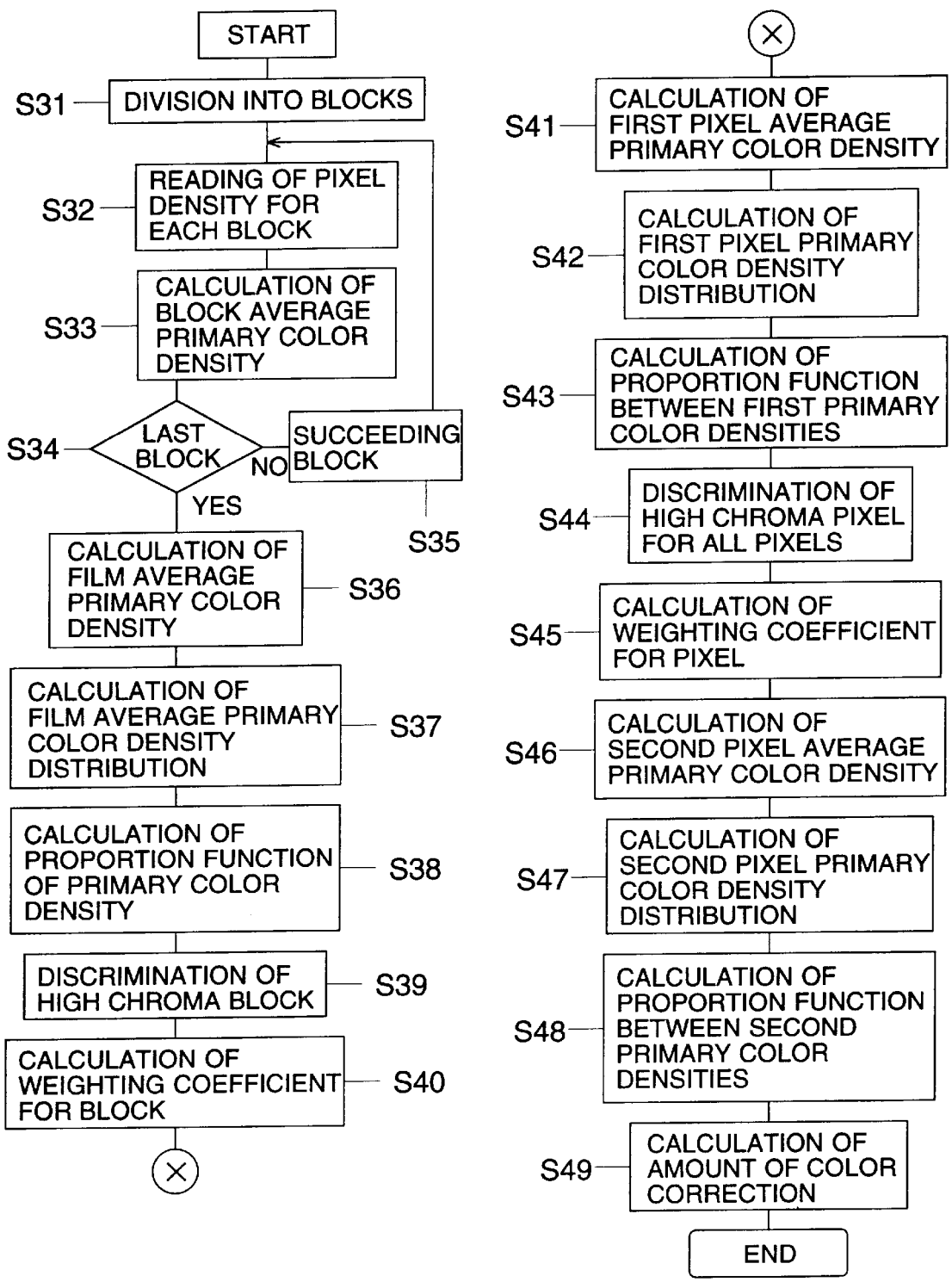
FIG. 9 is a flow chart for obtaining an amount of color correction in Embodiment 3.

This embodiment is the same as Embodiment 1 except that an amount of color correction is obtained from color digital original images on frames of plural Nf (e.g., Nf=24) recorded on a roll of film and except a method of obtaining an amount of color correction. Namely, Embodiment 3 is one wherein a method for obtaining a color correction amount in Embodiment 1 has been changed to one stated below. Explanation will be made as follows based on a flow chart for obtaining an amount of color correction of the present embodiment shown in FIG. 9.

In step S31, each frame is first divided at regular intervals laterally into blocks in quantity of Mf (for example: Mf=8). Therefore, color digital original images on a roll of film are to have blocks in quantity of MF (MF-=Mf×Nf). Incidentally, Mf represents the number of blocks in each frame, and Nf represents the number of frames recorded in a roll of film. The number of pixels in each block is assumed to be N. The symbol m is established to be 1 in this case.

$$m \leftarrow 1$$

Next, in step S32, each primary color density X (k, m, i, j) (k=B, G, R: m=1–MF) for B, G and R of pixel (i, j) in m-th block is read and is set on RAM.

In step S33, block mean primary color density AVE (k, m) (k=B, G, R: m=1–MF) which is a mean value of each primary color density of B, G and R in m-th block of the film is calculated. Its value is used later.

$$AVE(k, m) \leftarrow \frac{\sum_{i,j}(k, m, i, j)}{N}$$

In step S34, an operated block is judged whether it is a block of the last order (MF) in color digital images in a roll of film or not, and when it is the last block (Yes in illustration), the following step 36 is executed, while when it is not the last block (No in illustration), the sequence advances to step S35.

In step S35, 1 is added to a variable for operation of the following block, and processes of step S32 and thereafter are executed again.

$$m \leftarrow m+1$$

As described above, the block mean primary color density AVE (k, m) (k=B, G, R: m=1 to MF) can be found for the entire blocks of the input digital images of the photographic film.

In the following steps S36 through S40, it is estimated for each of blocks of all recorded frames on one roll of film whether any block is high chroma or not, and such high chroma block is excluded.

In step S36, the film mean primary color density FAVE (k) (k=B, G, R) is found from the block mean primary color density AVE (k, m) (k=G, B, R: m=1 though MF) of the entire blocks.

$$FAVE(k) \leftarrow \sum_{m} AVE(k, m) / Mf$$

Next, in step S37, the block primary color density distribution FS (k) (k=B, G, R) is found from the block mean primary color density AVE (k, m) (k=B, G, R: m=1 through MF) and the film mean primary color density FAVE (k) (k=B, G, R).

$$FS(k) \leftarrow \sum_{m}(AVE(k, m) - FAVE(k))^2 \qquad \text{[Equation 11]}$$

Next, in step S38, a proportion function of the film primary color density, which is a proportion function between respective primary color densities of B, G, R of the input digital image of the photographic film, is found from the block mean primary color density AVE (k, m) (k=B, G, R: m=1 through MF), the film mean primary color density FAVE (k) (k=B, G, R), and the film primary color density distribution FS (k) (k=B, G, R), by using the least square method. That is, the proportion functions of the block primary color density are expressed by the following equations:

when the primary color density is D(k) (k=B, G, R), $$D(B) = A_{BG} \times D(G) + B_{BG}$$

$$D(G) = A_{GR} \times D(R) + B_{GR}$$

$$D(R) = A_{BR} \times D(B) + B_{BR},$$

and proportional coefficients $A_{BG}$, $A_{GR}$, $A_{RB}$ and proportional constants $B_{BG}$, $B_{GR}$, $B_{RB}$ are determined by the following equations.

Equation 12

$$A_{BG} \leftarrow FS(B)/FS(G)$$

$$A_{GR} \leftarrow FS(G)/FS(R)$$

$$A_{RB} \leftarrow FS(R)/FS(B)$$

$$B_{BG} \leftarrow FAVE(R) - A_{BG} \times FAVE(G)$$

$$B_{GR} \leftarrow FAVE(G) - A_{GR} \times FAVE(R)$$

$$B_{RB} \leftarrow FAVE(R) - A_{RB} \times FAVE(B)$$

Next, in step S39, a dominant amount of block specific color CD (m) (m=1 through MF) is determined from proportional coefficients $A_{BG}$, $A_{GR}$, $A_{RB}$ and proportional constants $B_{BG}$, $B_{GR}$, $B_{RB}$ of the proportion function of the block primary color density, and the block mean primary color density AVE (k, m) (k=B, G, R: m=1 through MF).

Equation 13

$$CD(m) \leftarrow (AVE(B,m) - A_{BG} \times AVE(G,m) - B_{BG})^2$$

$$+ (AVE(G,m) - A_{GR} \times AVE(R,m) - B_{GR})^2$$

$$+ (AVE(R,m) - A_{RB} \times AVE(B,m) - B_{RB})^2$$

Next, in step S40, a weighting coefficient for the m-th block α (m) (m=1 through MF) is determined from the dominant amount of block specific color CD (m) (m=1 through MF) and a preset allowable dominant amount of block specific color PCD. In this connection, when the dominant amount of block specific color CD (m) (m=1 through MF) of a certain block is more than the allowable dominant amount of PCD, the allowable dominant amount of specific color PCD is a value used to estimate that the block is high chroma.

$$\alpha(m) \leftarrow LT(CD(m), PCD)$$

Herein, LT (p, q) is a function by which "1" is given when p is smaller than q, and "0" is given when p is not less than q. Accordingly, when p is smaller than q, it is judged that the block is not a high chroma block, and the result is inputted into the first statistic function. When p is not less than q, it is judged that the block is a high chroma block, and it is excluded from the first statistic function.

Next, in the following steps S41 through S43, a proportion function between first primary color densities which is the first statistic function, excluding high chroma blocks, is determined by using the block weighting coefficient $\alpha$ (m) (m=1 through MF), which is the block weighting coefficient for the m-th block.

In step S41, the first mean primary color density $AVE_1$ (k) (k=B, G, R), which is the film mean primary color density from which influence of the high chroma block is reduced, is determined from the block mean primary color density AVE (k, m) (k=B, G, R: m=1 through MF), and the block weighting coefficient $\alpha$ (m) (m=1 through MF), for all blocks.

Equation 14

$$AVE_1(k) \leftarrow \sum_{m=0}^{Mf} \alpha(m) \times AVE(k, m) / Mf$$

Next, in step S42, the first primary color density distribution $S_1$ (k) (k=B, G, R) is determined from the block mean primary color density AVE (k, m) (k=B, G, R: m=1 through MF) and the first mean primary color density $AVE_1$ (k) (k=B, G, R).

Equation 15

$$S_1(k) \leftarrow \sum_{m=0}^{Mf} \alpha(m) \times (AVE(k, m) - AVE_1(k))^2$$

Next, in step S43, the proportion function between the first primary color densities is determined from the block mean primary color density AVE (k, m) (k=B, G, R: m=1 through MF), the first mean primary color density $AVE_1$ (k) (k=B, G, R) and the first primary color density distribution $S_1$ (k) (k=B, G, R), by the least square method, wherein the proportion function between the first primary color densities is the proportion function between primary color densities of B, G, R of the color digital primary image of the photographic film from which the influence of the high chroma block is reduced. That is, the proportion functions between the first primary color densities are expressed as follows when the primary color density is D (k) (k=B, G, R):

$$D(B) = A_{BG1} \times D(G) + B_{BG1}$$

$$D(G) = A_{GR1} \times D(R) + B_{GR1}$$

$$D(R) = A_{BR1} \times D(B) + B_{BR1},$$

and proportional coefficients $A_{BG1}, A_{GR1}, A_{RB1}$ and proportional constants $B_{BG1}, B_{GR1}, B_{RB1}$ are determined by the following equations.

Equation 16

$$A_{BG1} \leftarrow S_1(B)/S_1(G)$$

$$A_{GR1} \leftarrow S_1(G)/S_1(R)$$

$$A_{RB1} \leftarrow S_1(R)/S_1(B)$$

$$B_{BG1} \leftarrow AVE_1(B)/A_{BG1} \times AVE_1(G)$$

$$B_{GR1} \leftarrow AVE_1(G)/A_{GR1} \times AVE_1(R)$$

$$B_{RB1} \leftarrow AVE_1(R)/A_{RB1} \times AVE_1(B)$$

Next, in steps S44 and S45, all pixels, including pixels of the block which is judged to be a high chroma block, are judged whether they are high chroma pixels or not, according to the proportion functions between the first primary color densities, excluding the high chroma blocks, which are the first statistic functions, and the pixels which are judged to be high chroma pixels are excluded from the detected pixels.

In step S44, relating to all pixels including pixels of the blocks which are judged to be high chroma blocks, the dominant amount of pixel specific color PCD (m, i, j) (m=1 through MF) is determined from proportional coefficients $A_{BG1}, A_{GR1}, A_{RB1}$, and proportional constants $B_{GB1}, B_{GR1}, B_{RB1}$ of the proportion function between the first primary color densities, and the pixel primary density X (k, m, i, j) (k=B, G, R: m=1 through MF).

$$PCD_{BG}(m, i, j) \leftarrow X(B, m, i, j) - A_{BG1} \times X(G, m, i, j) - B_{BG1}$$

$$PCD_{GR}(m, i, j) \leftarrow X(G, m, i, j) - A_{GR1} \times X(R, m, i, j) - B_{GR1}$$

$$PCD_{BR}(m, i, j) \leftarrow X(R, m, i, j) - A_{RB1} \times X(B, m, i, j) - B_{RB1}$$

$$PCD(m, i, j) \leftarrow PCD_{BG}(m, i, j)^2 + PCD_{GR}(m, i, j)^2 + PCD_{RB}(m, i, j)^2$$

Next, in step S45, the weighting coefficient for pixels of $\beta$ (m, i, j) (m=1 through MF), which is the weighting coefficient for pixel (i, j) of m-th block, is determined for all pixels including the high chroma blocks pixels, from the dominant amount of pixel specific color PCD (m, i, j) (m=1 through MF) and a preset allowable dominant amount of the specific color PCD.

$$\beta(m, i, j) \leftarrow LT(PCD(m, i, j), PCD)$$

Herein, LT (p, q) is a function which gives "1" when p is less than q, and gives "0" when p is not less than q.

Next, in the following steps of S46 though S48, the proportion function between second primary color densities, which is the second statistic function excluding high chroma pixels, is determined by using the pixel weighting coefficient $\beta$ (m, i, j) (m=1 through MF), which is a weighting coefficient for the pixel (i, j) of m-th block.

The second mean primary color density $AVE_2$ (k) (k=B, G, R), which is the film mean primary color density and from which the influence due to high chroma pixels is reduced, is determined from the pixel primary color density X (k, m, i, j) (k=B, G, R: m=1 through MF) and the pixel weighting coefficient $\beta$(m, i, j) (m=1 through MF), for all pixels, so that the proportion function between second primary color densities, which is the proportion function between primary color densities of B, G, R of the input digital image of the photographic film from which the influence due to high chroma pixels is reduced, is determined by using the least square method.

$$AVE_2(k) \sum_m \sum_{i,j} \beta(m, i, j) \times X(k, m, i, j) / Mf \qquad [\text{Equation 17}]$$

Next, in step S47, the second primary color density distribution S1 (k) (k=B, G, R) is determined from the pixel primary color density X (k, m, i, j) (k=B, G, R: m=1 through MF), the pixel weighting coefficient $\beta$ (m, i, j) (m=1 through MF), and the second mean primary density $AVE_2$ (k) (k=B, G, R).

$$S_2(k) \leftarrow \sum_m \sum_{i,j} [\beta(m, i, j) \times X(k, m, i, j) - AVE_2(k)]^2 \quad \text{[Equation 18]}$$

Next, in step S48, the proportion function between second primary color densities, which is the proportion function between primary color densities of B, G, R of the input digital image of the photographic film from which the influence due to high chroma blocks is reduced, is determined from the pixel primary color density X (k, m, i, j) (k=B, G, R: m=1 through MF), the pixel weighting coefficient β(m, i, j) (m=1 through MF), the second mean primary color density $AVE_2$ (k) (k=B, G, R), and the second primary color density distribution $S_2$ (k) (k=B, G, R) by using the least square method. That is, the proportion function between second primary color densities is determined as follows, when the primary color density is expressed by D (k) (k=B, G, R):

$$D(B) = A_{BG2} \times D(G) + B_{BG2}$$

$$D(G) = A_{GR2} \times D(R) + B_{GR2}$$

$$D(R) = A_{RB2} \times D(B) + B_{RB2},$$

and proportional coefficients $A_{BG2}$, $A_{GR2}$, $A_{RB2}$ and proportional constants $B_{BG2}$, $B_{GR2}$, $B_{RB2}$ are determined by the following equations.

$$A_{BG2} \leftarrow S_2(B)/S_2(G)$$

$$A_{GR2} \leftarrow S_2(G)/S_2(R)$$

$$A_{RB2} \leftarrow S_2(R)/S_2(B)$$

$$B_{BG2} \leftarrow AVE_2(B) - A_{BG2} \times AVE_2(G)$$

$$B_{GR2} \leftarrow AVE_2(G) - A_{GR2} \times AVE_2(R)$$

$$B_{RB2} \leftarrow AVE_2(R) \times A_{RB2} \times AVE_2(B)$$

Next, in step S49, the amount of color correction is determined from the proportion function between second primary color densities, which is the second statistic function. That is, as shown by the following equation, the frame mean primary color density AVE (k, f) (k=B, G, R: f=1 through Nf) is determined from the block mean primary color density AVE (k, m, f) (k=B, G, R: m=1 through Mf: f=1 through Nf) of the block m belonging to the f-th frame. Then, the dominant amount of green of the frame PCD (G, f) (f=1 through Nf), which is an estimated amount of the dominance property of green, the dominant amount of blue of the frame PCD (B, f) (f=1 through Nf), which is an estimated amount of the dominance property of blue, and the dominant amount of red of the frame PCD (R, f) (f=1 through Nf), which is an estimated amount of the dominance property of red, of the f-th frame, are determined from the obtained frame mean primary color density AVE (k, f) (k=B, G, R: f=1 through Nf), and proportional coefficients $A_{BG2}$, $A_{GR2}$, $A_{RB2}$, and proportional constants $B_{BG2}$, $B_{GR2}$, $B_{RB2}$ of the proportion function between second primary color densities, and then, an amount of color correction for each of the three primary colors of the f-th frame (Ec (B, f), Ec (G, f), Ec (R, f)) (f=1 through Nf) is determined.

$$AVE(k, f) \leftarrow \sum_m AVE(k, m, f)/Mf \quad \text{[Equation 19]}$$

PCD (B, f)←(AVE (R, f)−$B_{RB2}$)/$A_{RB2}$−AVE (B, f)+$A_{BG2}$×AVE (G, f)+$B_{GB2}$−AVE (B, f)

PCD (G, f)←(AVE (B, f)−$B_{BG2}$)/$A_{BG2}$−AVE (G, f)+$A_{GR2}$×AVE (R, f)+$B_{GR2}$−AVE (G, f)

PCD (R, f)←(AVE (G, f)−$B_{GR2}$)/$A_{GR2}$−AVE (R, f)+$A_{RB2}$×AVE (B, f)+$B_{RB2}$−AVE (R, f)

PCD (N, f)←1/3×(PCD (G, f)+PCD (B, f)+PCD (R, f))

Ec (B, f)←PCD (B, f)−PCD (N, f)

Ec (G, f)←PCD (G, f)−PCD (N, f)

Ec (R, f)←PCD (R, f)−PCD (N, f)

Thus, the amount of color correction for each frame f (Ec (B, f), Ec (G, f), Ec (R, f)) (f=1 through Nf) is determined.

Then, the mean density (BM (f), GM (f), RM (f)) (f=1 through Nf) is determined from the density (X (x, y, B, f), X (x, y, G, f), X (x, y, R, f)) (f=1 through Nf), of each pixel (x, y) of the color digital primary image of each frame f. After this, the density X (x, y, k, f) (k=B, G, R: f=1 through Nf) of each pixel (x, y) of the color digital primary image of each frame f is corrected by the following equations, and the output image (Y (x, y, B, f), Y (x, y, G, f), Y (x, y, R, f)) (f=1 through Nf), in which color balance is appropriately corrected, is obtained.

Y (x, y, B, f)=X (x, y, B, f)−BM (f)+Ec (B, f)

Y (x, y, G, f)=X (x, y, G, f)−BM (f)+Ec (G, f)

Y (x, y, R, f)=X (x, y, R, f)−BM (f)+Ec (R, f)

Then, the outputted image, obtained by the above-described color correction, is exposed on photographic paper by the exposure section 200 in the image processing section 300, and after the exposed photographic paper has been impregnation development-processed and printed by the paper development processing section 4, a print which is excellent in color balance, can be obtained. Further, when the outputted image, obtained by the above-described color correction in the image processing section 300, is displayed on the monitor 310, a monitor image having excellent color balance can be displayed.

As a modified embodiment of Example 1, the color correction method in Example 1 may also be used for determining the amount of color correction to correct the amount of exposure by the LATD control in the photographic printing apparatus by which an image is exposed on the photographic printing paper for printing, according to the amount of exposure by the LATD control.

In this case, the final amount of exposure is determined by adding the amount of color correction obtained by the color correction method in Example 1 to the amount of exposure obtained by the LATD control. Then, when an image is printed on the printing paper by this photographic printing apparatus according to the obtained amount of exposure, a well color-balanced print is obtained by development-processing the printed printing paper.

EXAMPLE 4

This example is similar to Example 3 except for the following points. That is, in Example 3, the first and the second statistical functions are functions between densities obtained by respective mutual relationships between the densities of B, G and R. However, in Example 4, they are functions which are determined by the mutual relationships between the neutral density (the mean density which a blue density, a green density, and a red density are averaged), and respective density differences between primary color densities and the mean density of blue and red.

EXAMPLE 5

Figure 10:
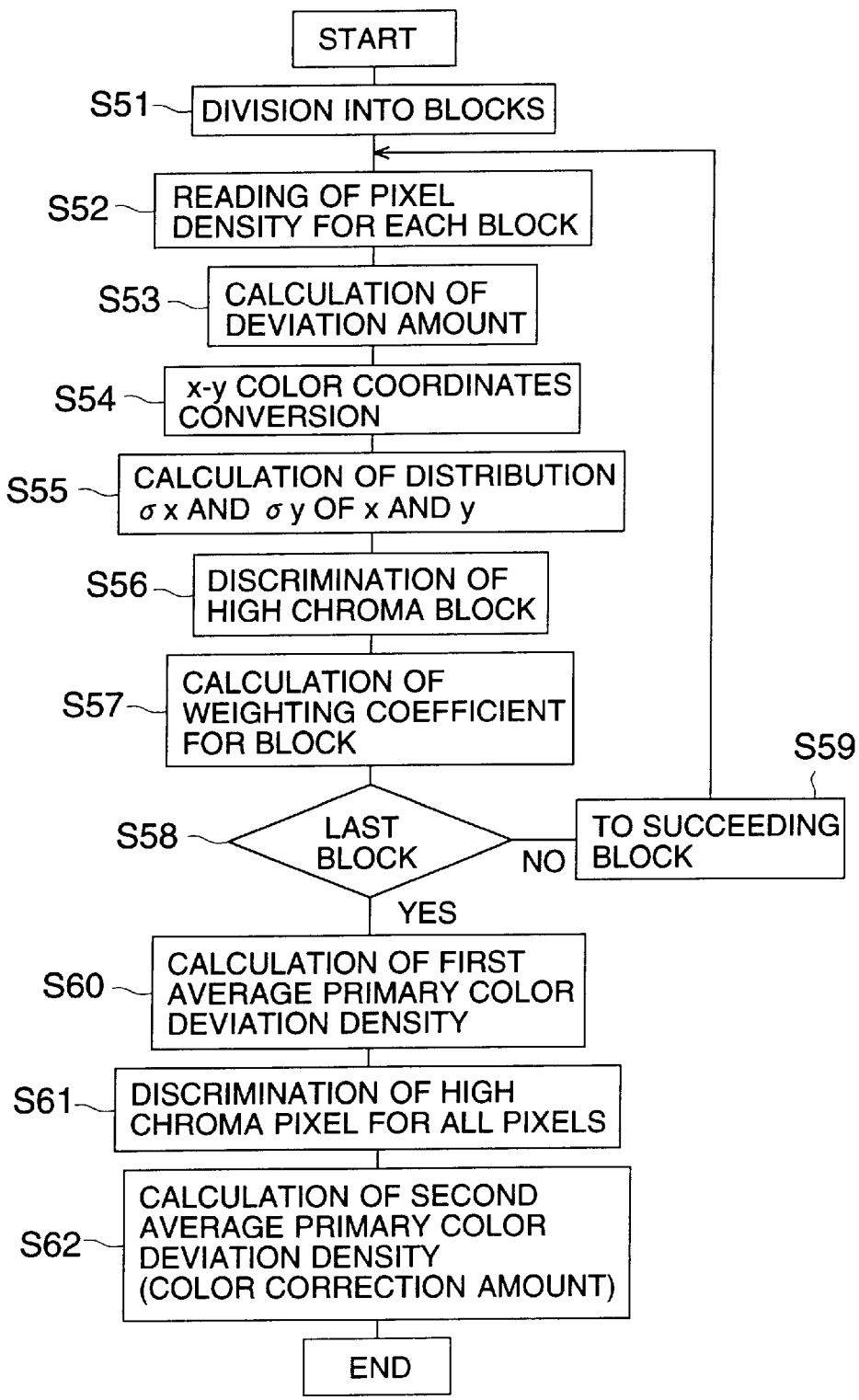
FIG. 10 is a flow chart for obtaining an amount of color correction in Embodiment 5.

Example 5 is the same as Example 1 except that the method to determine the amount of color correction Ec (k) (k=B, G, R) in Example 1 is changed to the following. Example 5 will be described below according to a flow chart to determine the amount of color correction Ec (k) (k=B, G, R) as shown in FIG. 10.

Initially, in S51, one frame of the color digital primary image is divided into equal rectangular Mf blocks (example: Mf=64: 8 longitudinally×8 laterally). The number of pixels of each block is N, and m is set to 1.

$$m \leftarrow 1$$

Next, in S52, each primary color density x (k, m, i, j) (k=B, G, R: m=1 through Mf) of B, G, R of a pixel (i, j) of m-th block is read out, and is set in a RAM.

In the following steps of S52 through S59, it is respectively estimated whether each block is a high chroma block or not, and the block which is estimated to be a high chroma block, is excluded.

In S53, a deviation amount V (k, m, i, j) (k=B, G, R: m=1 through Mf) of each pixel from a neutral value N (m, i, j) (m=1 through Mf) of each primary color density, is determined.

$$N(m, i, j) = 1/3 \times (X(B, m, i, j) + X(G, m, i, j) + X(R, m, i, j))$$

$$V(B, m, i, j) = X(B, m, i, j) - N(m, i, j)$$

$$V(G, m, i, j) = X(G, m, i, j) - N(m, i, j)$$

$$V(R, m, i, j) = X(R, m, i, j) - N(m, i, j)$$

Next, in S54, the deviation amount V (k, m, i, j) (k=B, G, R: m=1 through Mf) is converted into a color coordinate $\Delta x$ (m, i, j) (m=1 through Mf) and $\Delta Y$ (m, i, j) (m=1 through Mf) of the XYZ color space system by using the following equations.

$$\Delta X(m, i, j) = V(R, m, i, j) - 1/2 \times (v(B, m, i, j) + V(R, m, i, j))$$

$$\Delta Y(m, i, j) = \sqrt{3}/2 \times (V(B, m, i, j) - V(R, m, i, j))$$

Next, in S55, variances σX (m) and σY (m) of ΔX (m, i, j) and ΔY (m, i, j) are calculated for each block (m=1 through Mf). These variances can be calculated by normal statistical operations.

Next, in S56, each block (m=1 through Mf) is estimated whether it is a high chroma block or not, depending on whether the variance σX (m) is less than a predetermined value σXC, and the variance σY (m) is less than a predetermined value σYC. Incidentally, the predetermined value σXc may be equal to the predetermined value σYC, or not.

Then, in S57, a block weighting coefficient α (m) of the block which has been estimated to be high chroma, is set to "0", and that of other blocks, which have not been estimated to be high chroma, is set to "1".

Then, in S58, it is judged whether the block m, which has just been operated on, is a last Mf block or not. When the block m, which has just been operated on, is the last Mf block, the sequence advances to S60, and when it is not the last Mf block, the sequence advances to S59, and m is increased by 1. Then, the sequence returns to S52.

Following the above operation, in S60, the first mean primary color deviation density Δ $AVE_1$ (k) (k=B, G, R), which is the first statistic function showing color balance features, from which influence due to the high chroma blocks is excluded, is determined by the following equation.

Equation 20

$$AVE_1(k) = \frac{\sum_m \sum_i \sum_j \alpha(m) \times V(k, m, i, j)}{Mf \times N}$$

Next, in S61, the deviation amount V (k, m, i, j) (k=B, G, R: m=1 through Mf) of each pixel is compared to predetermined values LD (k) and HD (k), according to the first mean primary color deviation density Δ $AVE_1$ (k) (k=B, G, R), obtained above, and then, it is estimated whether the pixel is high chroma or not. That is, when all of the following equations are satisfied, it is estimated that the pixel is not high chroma, and the weighting coefficient β (m, i, j) is set to "1". When any of the following equations is not satisfied, it is estimated that the pixel is high chroma, and the weighting coefficient β (m, i, j) is set to "0".

$$LD(B) < V(B, m, i, j) - \Delta AVE_1(B) < HD(B)$$

$$LD(G) < V(G, m, i, j) - \Delta AVE_1(G) < HD(G)$$

$$LD(R) < V(R, m, i, j) - \Delta AVE_1(R) < HD(R)$$

Then, in S62, the second mean primary color deviation density Δ $AVE_2$ (k) (k=B, G, R), which is the second statistic function showing color balance features, from which influence due to the high chroma pixels is excluded, is determined by the following equation.

Equation 21

$$AVE_2(k) = \frac{\sum_m \sum_i \sum_j \beta(m, i, j) \times V(k, m, i, j)}{Mf \times N}$$

The thus determined second mean primary color deviation density Δ $AVE_2$ (k) (k=B, G, R) can be used as an amount of color correction as it is. When the amount of color correction is added to the color digital primary image, an output image, in which the color balance is satisfactorily corrected, is obtained.

A satisfactorily color balanced image is obtained on a gray-balanced display monitor which is set such that the output image, which has been obtained as described above, displays an achromatic color when its image signal is B=G=R, or in a gray-balanced image output apparatus which is set so as to output an achromatic color hard copy when B=G=R.

According to the present invention, even if a color primary image has a large color deviation, an appropriate amount of color correction can be obtained, and a high quality output image is possible, without requiring any operator correcting operation on the displayed image.

What is claimed is:

1. A method of obtaining a color correcting condition for a color image on an image frame, comprising steps of:

obtaining plural color component image signals for each pixel of the color image, wherein each image signal indicates a density value representing a density level of a color component;

dividing the image frame into plural blocks each of which includes plural pixels;

obtaining a block color density value statistic to evaluate a chroma level of each block from the plural color component signals of the plural pixels of each block;

evaluating a chroma level of each block based on the block color density value statistic;

reducing an influence of a block evaluated as a high chroma block on the color image on the image frame;

obtaining a first color density value statistic to evaluate a chroma level of each pixel from the plural color component signals of the plural pixels of the plural blocks of the image frame after the step of reducing the influence of the block;

evaluating a chroma level of each pixel based on the first color density value statistic;

reducing an influence of a pixel evaluated as a high chroma pixel on the color image on the image frame;

obtaining a second color density value statistic from the plural color component signals of the plural pixels of the plural blocks of the image frame after the step of reducing the influence of the pixel; and determining the color correcting condition for the color image of the image frame based on the second color density statistic.

2. The method of claim 1, wherein the plural color components are primary colors of red, green and blue.

3. The method of claim 1, wherein the image frame is one of plural image frame of a roll film and the first and second color density value statistics are obtained from the plural color component signals of the plural pixels of the plural blocks of the plural image frames.

4. The method of claim 1, wherein the image frame is obtained by a color digital camera.

5. The method of claim 1, wherein the plural pixels of the plural blocks used to obtain the first color density value statistic includes the plural pixels of the block evaluated as the high chroma block.

6. The method of claim 1, wherein the statistic is a cumulative density function between a density value and a number of pixels indicating the density value, and the statistic is obtained for each color component.

7. The method of claim 1, wherein the statistic is a relationship between density values of first and second color components.

8. The method of claim 7, wherein the relationship is a proportional function obtained by at least square method.

9. The method of claim 1, wherein the statistic is a relationship between a density value difference between first and second color components and a density value of neutral color.

10. The method of claim 1, wherein the statistic is an average density value of each color component.

11. The method of claim 1, wherein the color correcting condition is used to determine an exposure amount to print the color image onto a color photographic paper.

12. The method of claim 1, wherein the color correcting condition is used to correct the plural color component image signals of each pixel of the color image and the color image is formed by using the corrected plural color component image signals.

13. The method of claim 1, wherein the step of obtaining plural color component image signals for each pixel of the color image comprises receiving the plural color component image signals for each pixel of the color image read by an image reading means.

14. The method of claim 1, wherein the image frame is divided into 64×64 blocks or less.

15. A memory medium for use in a computer, storing a program for executing steps of obtaining a color correcting condition for a color image on an image frame, the steps comprising steps of:

obtaining plural color component image signals for each pixel of the color image, wherein each image signal indicates a density value representing a density level of a color component;

dividing the image frame into plural blocks each of which includes plural pixels;

obtaining a block color density value statistic to evaluate a chroma level of each block from the plural color component signals of the plural pixels of each block;

evaluating a chroma level of each block based on the block color density value statistic;

reducing an influence of a block evaluated as a high chroma block on the color image on the image frame;

obtaining a first color density value statistic to evaluate a chroma level of each pixel from the plural color component signals of the plural pixels of the plural blocks of the image frame after the step of reducing the influence of the block;

evaluating a chroma level of each pixel based on the first color density value statistic;

reducing an influence of a pixel evaluated as a high chroma pixel on the color image on the image frame;

obtaining a second color density value statistic from the plural color component signals of the plural pixels of the plural blocks of the image frame after the step of reducing the influence of the pixel; and determining the color correcting condition for the color image of the image frame based on the second color density statistic.

16. The memory medium of claim 15, wherein the memory stores plural block weighting coefficients, and a block weighting coefficient of a block is determined in accordance with the chroma level of the block.

17. The memory medium of claim 15, wherein the memory stores pixel block weighting coefficients, and a block weighting coefficient of a pixel is determined in accordance with the chroma level of the pixel.

18. The memory medium of claim 15, wherein the image frame is one of plural image frames of a roll film and the first and second color density value statistics are obtained from the plural color component signals of the plural pixels of the plural blocks of the plural image frames.

19. The memory medium of claim 15, wherein the plural pixels of the plural blocks used to obtain the first color density value statistic includes the plural pixels of the block evaluated as the high chroma block.

* * * * *